US012594763B2

(12) United States Patent
Yotsuya et al.

(10) Patent No.: US 12,594,763 B2

(45) Date of Patent: Apr. 7, 2026

(54) METHOD OF MANUFACTURING LIQUID DISCHARGING HEAD, METHOD OF MANUFACTURING NOZZLE SUBSTRATE, AND LIQUID DISCHARGING HEAD

(71) Applicant: SEIKO EPSON CORPORATION, Tokyo (JP)

(72) Inventors: Shinichi Yotsuya, Chino (JP); Masahiro Fujii, Shiojiri (JP); Koji Kitahara, Ina (JP)

(73) Assignee: SEIKO EPSON CORPORATION (JP)

( * ) Notice: Subject to any disclaimer, the term of this patent is extended or adjusted under 35 U.S.C. 154(b) by 191 days.

(21) Appl. No.: 18/617,705

(22) Filed: Mar. 27, 2024

(65) Prior Publication Data

US 2024/0326437 A1 Oct. 3, 2024

(30) Foreign Application Priority Data

Mar. 28, 2023 (JP) ................................ 2023-051084

(51) Int. Cl.

*B41J 2/16* (2006.01)
*B41J 2/14* (2006.01)

(52) U.S. Cl.

CPC ............ *B41J 2/162* (2013.01); *B41J 2/1433* (2013.01); *B41J 2/1629* (2013.01); *B41J 2/1631* (2013.01); *B41J 2/164* (2013.01); *B41J 2002/14475* (2013.01)

(58) Field of Classification Search

CPC ........ B41J 2/162; B41J 2/1433; B41J 2/1629; B41J 2/1631; B41J 2/164; B41J 2002/14475; B41J 2/1642; B41J 2/1646; B41J 2/1628

See application file for complete search history.

(56) References Cited

U.S. PATENT DOCUMENTS

2019/0255846 A1 8/2019 Shimomura et al.
2020/0395528 A1* 12/2020 Fujii ...................... B41J 2/1642

FOREIGN PATENT DOCUMENTS

JP 2022-025115 A 2/2022

OTHER PUBLICATIONS

S. Kamisuki, et al. "A High Resolution, Electrostatically-Driven Commercial Inkjet Head"; article by Production Engineering & Development Department, Seiko Epson Corporation; first edition; Aug. 29, 2008 (total 6 pages).

"Base and the Latest Application of Piezoelectric Materials" with English explanation of relevance; First Edition; Author: unknown; Published on Aug. 29, 2008 (total 3 pages).

* cited by examiner

*Primary Examiner* — Bradley W Thies

(74) *Attorney, Agent, or Firm* — Harness, Dickey & Pierce, P.L.C.

(57) ABSTRACT

A method of manufacturing a liquid discharging head includes a pressure chamber substrate that includes a pressure chamber and a nozzle substrate that includes a nozzle communicating with the pressure chamber and is formed of a semiconductor substrate, the method including a first step in which, in a state where a metal film is formed on the nozzle substrate in a first portion corresponding to the nozzle of a first surface which is a surface of the nozzle substrate on a pressure chamber substrate side, and the metal film is not formed on the nozzle substrate in a second portion not corresponding to the nozzle of the first surface, the nozzle is formed by carrying out metal assist chemical etching.

14 Claims, 20 Drawing Sheets

METHOD OF MANUFACTURING LIQUID DISCHARGING HEAD, METHOD OF MANUFACTURING NOZZLE SUBSTRATE, AND LIQUID DISCHARGING HEAD

The present application is based on, and claims priority from JP Application Serial Number 2023-051084, filed Mar. 28, 2023, the disclosure of which is hereby incorporated by reference herein in its entirety.

BACKGROUND

1. Technical Field

The present disclosure relates to a method of manufacturing a liquid discharging head, a method of manufacturing a nozzle substrate, and a liquid discharging head.

2. Related Art

In recent years, ink jet printers have attracted attention not only for printing applications but also as apparatuses that can apply a material that can be liquidized to any location. The ink jet printer includes a liquid discharging head that discharges a liquid. As a liquid discharging head, a head that discharges a liquid filled in a pressure chamber from a nozzle by vibrating a vibration plate constituting a wall surface of the pressure chamber with a piezoelectric element is known. Since the type of liquid is not limited in the liquid discharging head using a piezoelectric material as a power source, compared to the head using heat as a power source, the liquid discharging head is expected to be applied to a wide range of industrial applications.

The liquid discharging head is often manufactured by applying the MEMS technology. The MEMS technology is an abbreviation for Micro Electro Mechanical Systems. The liquid discharging head has a nozzle, and includes a nozzle substrate configured of a silicon substrate, for example. The nozzle substrate has a very high accuracy required for nozzle processing. In IEEE-Trans.MEMS00 Collection of Preliminary Lecture Scripts P. 793-798, a nozzle is formed by forming a two-stage vertical hole by using a photolithography technology and Si-Deep-RIE. Si-Deep-RIE is deep dry etching of silicon.

In the nozzle configured of the two-stage vertical holes disclosed in IEEE-Trans.MEMS00 Collection of Preliminary Lecture Scripts P. 793-798, a hole diameter of a first-stage vertical hole is larger than that of a second-stage vertical hole. Therefore, a large level difference occurs between the first-stage vertical hole and the second-stage vertical hole. The level difference causes turbulence of an ink and a stagnation of the ink flow. As a result, there is a concern that air bubbles stay in the vicinity of the level difference. When the air bubbles stay, there is a concern that issues in printing quality such as dot omission occur. A method of discharging air bubbles by pushing out a large amount of ink is considered. However, since the level difference causes a stagnation of the ink flow, even though a large amount of ink is pushed out, it is difficult to emit air bubbles.

In consideration of this problem, ideally, as disclosed in Basics and Latest Applications of Piezoelectric Material <popular edition>; supervised by SHIOSAKI Tadashi (CMC Publishing), FIG. 4 of P. 170, it is desired that the nozzle includes a tapered hole of which a diameter decreases from a side into which the ink enters to a side to which the ink is discharged, and a vertical hole that is coupled to the tapered hole. JP-A-2022-025115 discloses that a nozzle including a conical portion and a cylindrical portion is formed by combining anisotropic etching and dry etching of a single crystal silicon material.

However, with the anisotropic etching, it is very difficult to form an ideal conical hole. In particular, single crystal silicon is a brittle material and is difficult to process. Therefore, in the method in the related art, it is difficult to obtain a nozzle in which a conical hole and a vertical hole are combined. Accordingly, in the method in the related art, it is difficult to obtain a nozzle capable of obtaining an optimum discharge characteristic, and thereby it is difficult to manufacture a liquid discharging head having excellent discharge performance.

SUMMARY

According to an aspect of the present disclosure, there is provided a method of manufacturing a liquid discharging head including a pressure chamber substrate that includes a pressure chamber and a nozzle substrate that includes a nozzle communicating with the pressure chamber and is formed of a semiconductor substrate, the method including a first step in which, in a state where a metal film is formed on the nozzle substrate in a first portion corresponding to the nozzle of a first surface which is a surface of the nozzle substrate on a pressure chamber substrate side, and the metal film is not formed on the nozzle substrate in a second portion not corresponding to the nozzle of the first surface, the nozzle is formed by carrying out metal assist chemical etching.

According to another aspect of the present disclosure, there is provided a method of manufacturing a nozzle substrate that includes a nozzle and is formed of a semiconductor substrate, the method including: a first step in which, in a state where in a first portion corresponding to the nozzle of a first surface of the nozzle substrate, a metal film is formed on the nozzle substrate, and in a second portion not corresponding to the nozzle of the first surface, the nozzle is formed by carrying out metal assist chemical etching.

According to another preferred aspect of the present disclosure, there is provided a liquid discharging head including a pressure chamber substrate that includes a pressure chamber and a nozzle substrate that includes a nozzle communicating with the pressure chamber, in which the nozzle substrate is a p-type semiconductor substrate and the nozzle includes a tapered hole portion having a tapered angle of 4° or more and 20° or less.

DESCRIPTION OF EMBODIMENTS

1. First Embodiment

1-1. Overall Configuration of Liquid Discharging Apparatus 1

Figure 1:
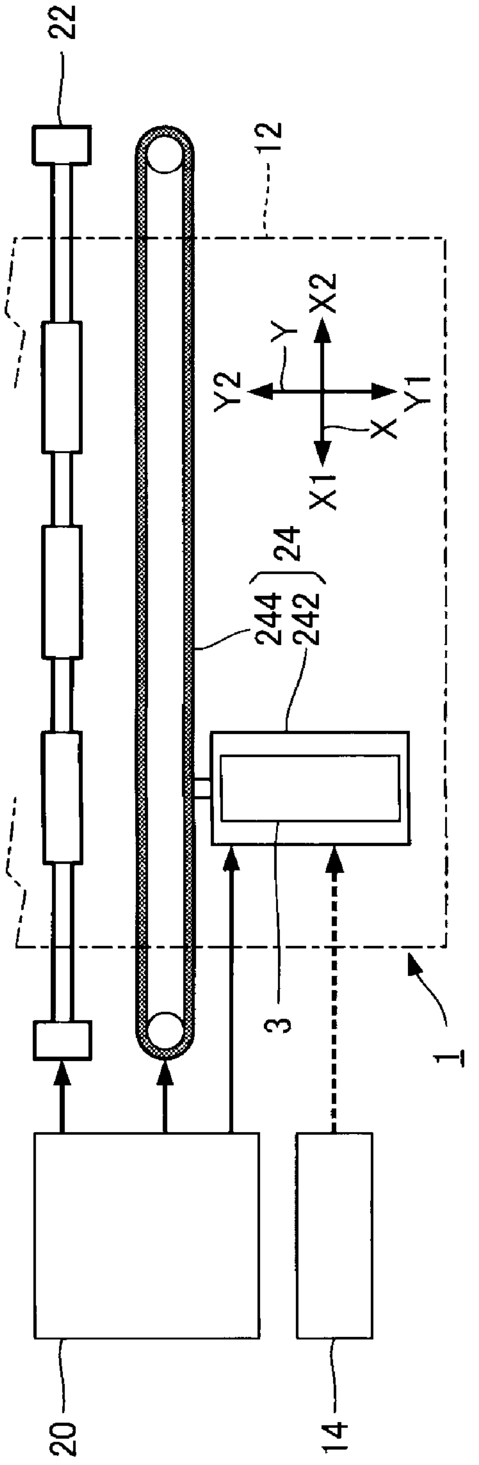
FIG. 1 is a schematic view illustrating a configuration of a liquid discharging apparatus according to a first embodiment.

FIG. 1 is a configuration view illustrating a liquid discharging apparatus 1 according to a first embodiment. Hereinafter, for convenience of description, the description will be made by appropriately using an X axis, a Y axis, and a Z axis which are orthogonal to one another. In addition, one direction along the X axis is referred to as an X1 direction, and a direction opposite to the X1 direction is referred to as an X2 direction. Similarly, one direction along the Y axis is referred to as a Y1 direction, and a direction opposite to the Y1 direction is referred to as a Y2 direction. One direction along the Z axis is referred to as a Z1 direction, and a direction opposite to the Z1 direction is referred to as a Z2 direction.

In addition, the phrase "element α communicates with element β" includes, in addition to a case where element α directly communicates with element β, a case where element α indirectly communicates with element β via other elements. The phrase "element β on element A" is not limited to a configuration in which the element α is in direct contact with the element β, and also includes a configuration in which the element A is not in direct contact with the element β.

A liquid discharging apparatus 1 is an ink jet printing apparatus that discharges an ink, which is an example of liquid, onto a medium 12. The medium 12 is typically printing paper, but a printing target of an arbitrary material such as a resin film or a cloth is used as the medium 12. As illustrated in FIG. 1, the liquid discharging apparatus 1 is installed with a container 14 that stores an ink. For example, a cartridge that is attachable to and detachable from the liquid discharging apparatus 1, a bag-shaped ink pack formed of a flexible film, or an ink tank that can be replenished with an ink is used as the container 14.

The liquid discharging apparatus 1 includes a control unit 20, a transport mechanism 22, a moving mechanism 24, and a liquid discharging head 3. The control unit 20 includes, for example, one or a plurality of processing circuits such as a central processing unit (CPU) or a field programmable gate array (FPGA) and one or a plurality of storage circuits such as a semiconductor memory, and controls each element of the liquid discharging apparatus 1 in an integrated manner. The transport mechanism 22 transports the medium 12 in a direction along the Y axis under the control of the control unit 20.

The moving mechanism 24 causes the liquid discharging head 3 to reciprocate along the X axis under the control of the control unit 20. The X axis intersects the Y axis along a direction in which the medium 12 is transported. The moving mechanism 24 of the first embodiment includes a substantially box-shaped transport body 242 that accommodates the liquid discharging head 3, and a transport belt 244 to which the transport body 242 is fixed. A configuration in which a plurality of the liquid discharging heads 3 are mounted on the transport body 242, or a configuration in which the container 14 is mounted on the transport body 242 together with the liquid discharging head 3 can be adopted.

The liquid discharging head 3 discharges the ink supplied from the container 14 from a plurality of nozzles to the medium 12 under the control of the control unit 20. Each liquid discharging head 3 discharges the ink to the medium 12 by transport of the medium 12 and repetitive reciprocation of the transport body 242 due to the transport mechanism 22, and thereby an image is formed on a surface of the medium 12.

1-2. Overall Configuration of Liquid Discharging Head 3

Figure 2:
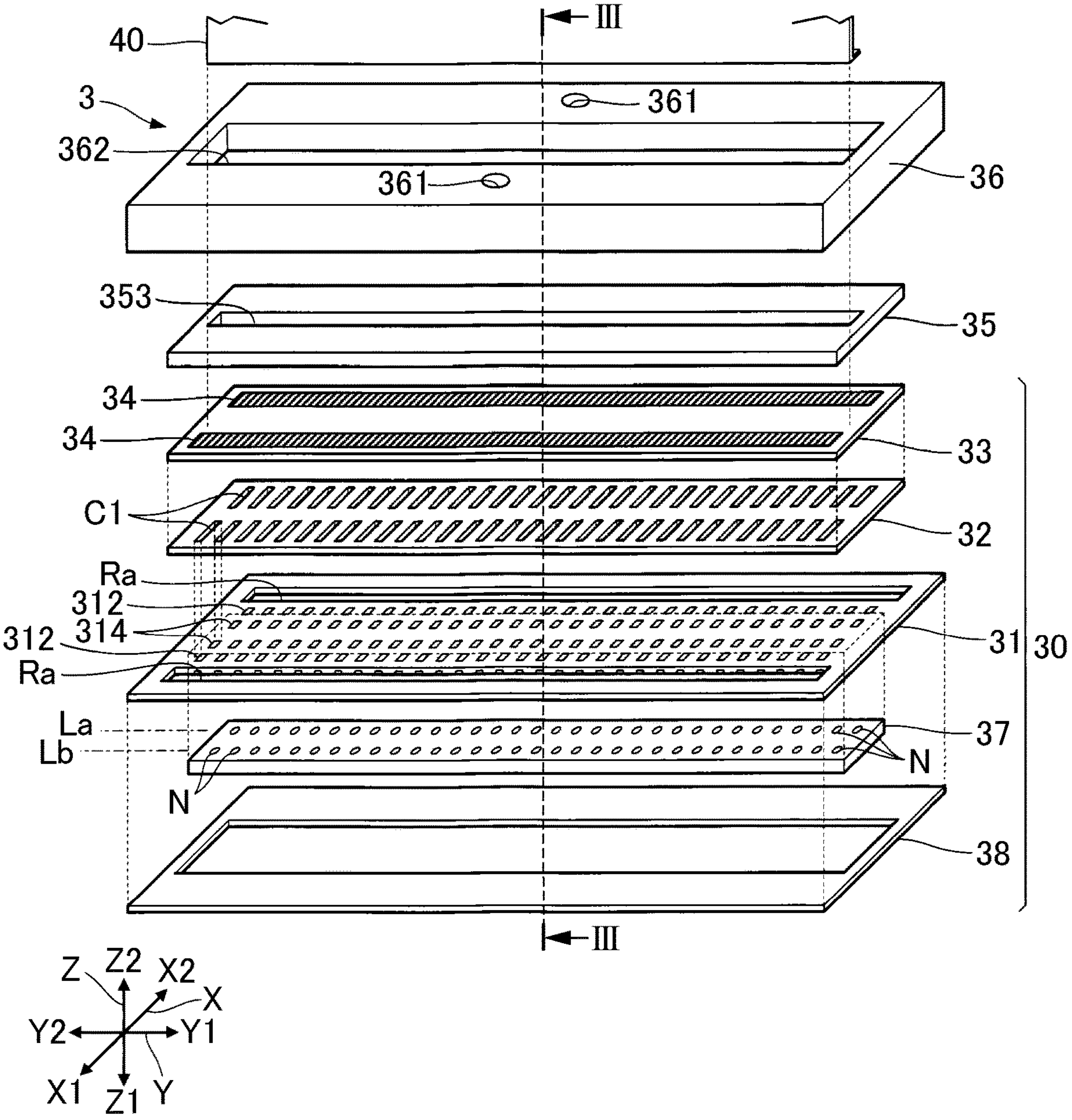
FIG. 2 is an exploded perspective view of a liquid discharging head shown in FIG. 1.
Figure 3:
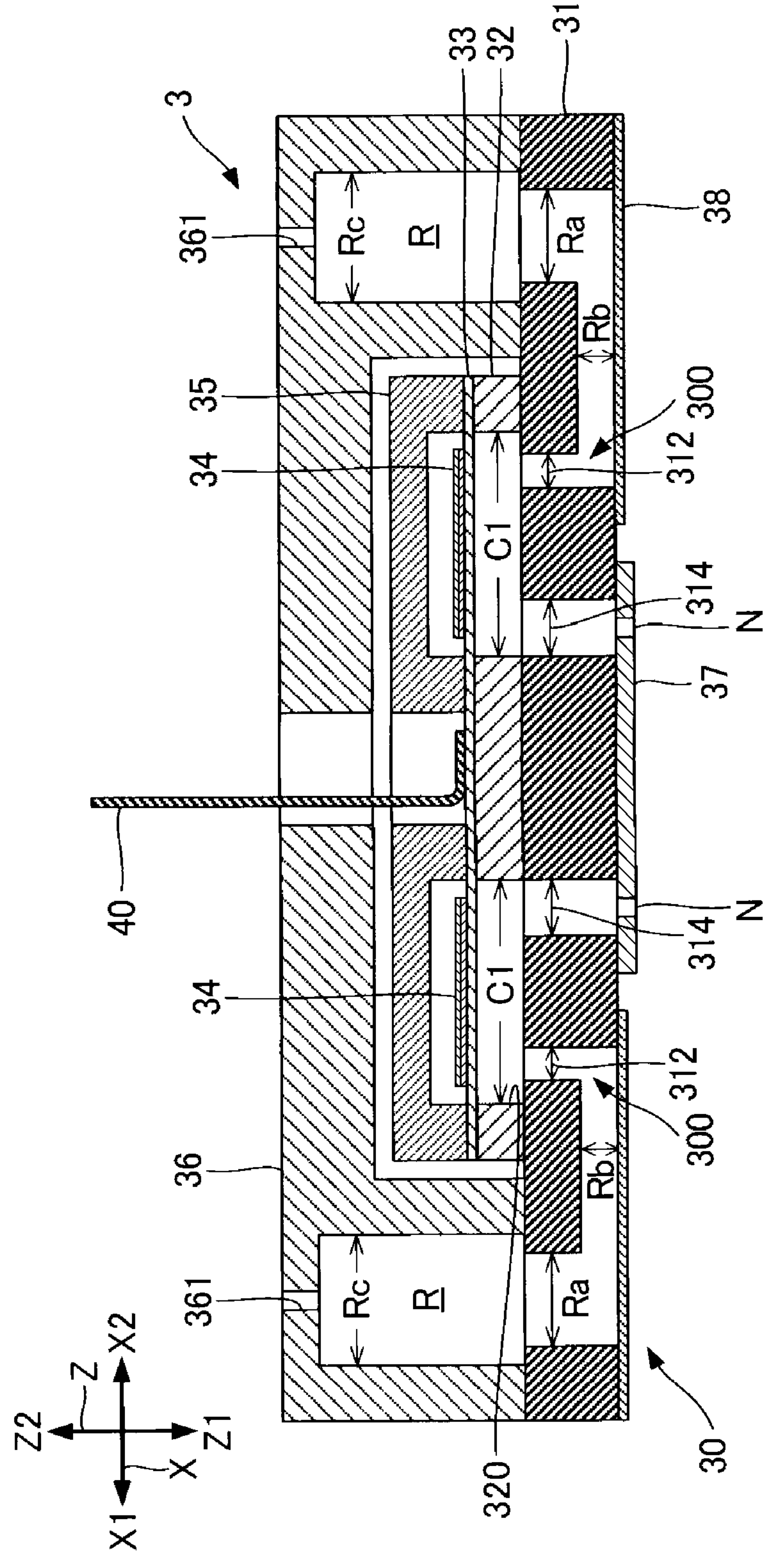
FIG. 3 is a sectional view taken along a line III-III in FIG. 2.

FIG. 2 is an exploded perspective view of the liquid discharging head 3 shown in FIG. 1. FIG. 3 is a sectional view taken along line III-III in FIG. 2. A section illustrated in FIG. 3 is a section parallel to an X-Z plane. The Z axis is an axis along an ink discharge direction by the liquid discharging head 3. In addition, viewing from the Z1 direction or the Z2 direction is referred to as "plan view".

As illustrated in FIG. 2, the liquid discharging head 3 includes a plurality of nozzles N arranged along the Y axis. The plurality of nozzles N are divided into a first row La and a second row Lb, which are disposed in parallel with each other at an interval along the X axis. Each of the first row La and the second row Lb is a set of the plurality of nozzles N linearly arranged along the Y axis. The liquid discharging head 3 has a structure in which an element related to each nozzle N in the first row La and an element related to each nozzle N in the second row Lb are disposed substantially in plane symmetry. The nozzles N belonging to the first row La are disposed in a row at a density of 300 dpi, for example. Similarly, the nozzles N belonging to the second row Lb are disposed in a row at a density of 300 dpi, for example. The nozzles N belonging to the second row Lb are disposed while being shifted by 600 dpi, for example, with respect to the nozzles N belonging to the first row La. In the following description, an element corresponding to the first row La will be mainly described, and the description of an element corresponding to the second row Lb will be appropriately omitted.

As illustrated in FIGS. 2 and 3, the liquid discharging head 3 includes a flow path structure body 30, a plurality of piezoelectric elements 34, a sealing substrate 35, a casing portion 36, and a wiring substrate 40.

The flow path structure body 30 is a structure in which a flow path for supplying an ink to each of the plurality of nozzles N is formed. The flow path structure body 30 is configured of a communication plate 31, a pressure chamber substrate 32, a vibration plate 33, a nozzle substrate 37, and a vibration absorbing body 38.

Each member constituting the flow path structure body 30 is a long plate-shaped member along the Y axis. The pressure chamber substrate 32 and the casing portion 36 are installed on a surface of the communication plate 31 in the Z2 direction. The nozzle substrate 37 and the vibration absorbing body 38 are installed on the surface of the communication plate 31 in the Z1 direction. Each of the members is fixed by an adhesive, for example.

The nozzle substrate 37 is a plate-shaped member in which the plurality of nozzles N are formed. Each of the plurality of nozzles N is a circular through-hole through which the ink is discharged.

The communication plate 31 is formed with a communication space Ra between a plurality of throttle portions 312 and a plurality of communication flow paths 314, and a common flow path Rb. Each of the throttle portions 312 and the communication flow paths 314 is a through-hole that extends in the Z1 direction and is formed for each nozzle N. The communication flow path 314 overlaps the nozzle N in a plan view. The communication space Ra is an opening formed in a long shape along the Y axis. The communication space Ra extends along the Y axis. The common flow path Rb communicates with the communication space Ra, and overlaps the communication space Ra in a plan view. The common flow path Rb extends along the Y axis. The common flow path Rb communicates with the plurality of throttle portions 312. In addition, the communication space Ra causes the common flow path Rb and an external flow path of the liquid discharging head 3 to communicate with each other via a space Rc described later.

A plurality of pressure chambers C1 are formed in the pressure chamber substrate 32. The pressure chamber C1 is a space positioned between the communication plate 31 and the vibration plate 33 and formed by a wall surface 320 of the pressure chamber substrate 32. The pressure chamber C1 is formed for each nozzle N. The pressure chamber C1 is a long-shaped space extending in the X1 direction. The plurality of the pressure chambers C1 are arranged along the Y axis. The nozzle N communicates with one end of the pressure chamber C1 in the X1 direction via a communication flow path 314. The throttle portion 312 communicates with the other end of the pressure chamber C1 in the X1 direction. The throttle portion 312 has a smaller cross-sectional area than the pressure chamber C1. In addition, an individual flow path 300 is configured for each nozzle N by the pressure chamber C1, the nozzle N, the communication flow path 314, and the throttle portion 312. By providing the communication flow path 314 and the throttle portion 312 in the Z1 direction with respect to the pressure chamber C1, the nozzles can be arranged at a high density, and the miniaturization and the high density of the liquid discharging head 3 can be obtained.

The communication plate 31 and the pressure chamber substrate 32 are manufactured by processing a single crystal substrate of silicon (Si).

An elastically deformable vibration plate 33 is disposed above the pressure chamber C1. The vibration plate 33 is stacked on the pressure chamber substrate 32 and is in contact with a surface of the pressure chamber substrate 32 opposite to the communication plate 31. The vibration plate 33 is a plate-shaped member formed in a long rectangular shape along the Y axis in a plan view. A thickness direction of the vibration plate 33 is parallel to the Z1 direction. The pressure chamber C1 communicates with the communication flow path 314 and the throttle portion 312. Therefore, the pressure chamber C1 communicates with the nozzle N via the communication flow path 314, and communicates with the communication space Ra via the throttle portion 312. In FIG. 2, the pressure chamber substrate 32 and the vibration plate 33 are illustrated as separate substrates for ease of explanation, but in practice, are stacked on one silicon substrate.

The piezoelectric elements 34 are formed for each pressure chamber C1 on the surface of the vibration plate 33 opposite to the pressure chamber C1. The piezoelectric element 34 is a long-shaped passive element along the X axis in a plan view. The piezoelectric element 34 is an illustration of an energy generating element that generates energy for discharging an ink by a drive signal being applied. Here, a piezoelectric element that generates mechanical energy is described as an "energy generating element", but an electrothermal conversion element that generates thermal energy may be used as long as the system has a vibration plate 33. In addition, the piezoelectric element 34 is also a driving element that is driven by a drive signal being applied.

The casing portion 36 is a case for storing an ink supplied to the plurality of the pressure chambers C1, and is formed by injection molding of a resin material, for example. A space Rc and a supply port 361 are formed in the casing portion 36. The supply port 361 is a pipeline to which an ink is supplied from the container 14, and communicates with the space Rc. The space Rc of the casing portion 36 and the communication space Ra of the communication plate 31 communicate with each other. A common space R common to the plurality of nozzles N is configured by the communication space Ra, the common flow path Rb, and the space Rc, which are described above. The common space R functions as a liquid storage chamber that stores an ink supplied to the plurality of the pressure chambers C1. The ink stored in the common space R branches into each of the throttle portions 312 and is supplied to and filled in the plurality of the pressure chambers C1 in parallel.

The vibration absorbing body 38 is a flexible film constituting a wall surface of the communication space Ra, and absorbs a pressure fluctuation of an ink in the common space R. The vibration absorbing body 38 is a laminated body of an ink-resistant resin film, an SUS (stainless steel) member holding the resin film and having spring properties, and a fixing plate protecting the resin film and the SUS member. By providing the vibration absorbing body 38, a specific frequency of the individual flow path 300 from the nozzle N to the throttle portion 312 via the pressure chamber C1 is stabilized regardless of the driven nozzle N.

The sealing substrate 35 is a structure that protects a plurality of piezoelectric elements 34 and reinforces the mechanical strength of the pressure chamber substrate 32 and the vibration plate 33, and is fixed to a surface of the vibration plate 33 with an adhesive, for example. The plurality of piezoelectric elements 34 are accommodated in an interior side of a recess portion formed on a surface facing the vibration plate 33 in the sealing substrate 35. In addition, the wiring substrate 40 is bonded to the surface of the vibration plate 33. The wiring substrate 40 is a mounting part on which a plurality of wirings for electrically coupling the control unit 20 and the liquid discharging head 3 are formed. As the wiring substrate 40, for example, a tape carrier package (TCP), a flexible printed circuit (FPC), or the like is used. A drive signal for driving the piezoelectric element 34 and a reference voltage are supplied to each piezoelectric element 34 from the wiring substrate 40.

In the liquid discharging head 3, when the piezoelectric element 34 contracts due to energization, the vibration plate 33 bends and is curved in a direction in which a volume of the pressure chamber C1 decreases, the pressure in the pressure chamber C1 increases, and ink droplets are discharged from the nozzle N. At this time, the pressure propagates from the pressure chamber C1 toward the throttle portion 312, and an ink flows also to the common flow path Rb through the throttle portion 312. After the ink is discharged, the piezoelectric element 34 is restored to an original position. At this time, the ink in the common flow path Rb from the nozzle N also vibrates. Then, the ink is supplied from the throttle portion 312 at the same time when a meniscus of the nozzle N is restored. The ink is discharged from the nozzle N by the above series of operations.

1-3. Nozzle Substrate 37

Figure 4:
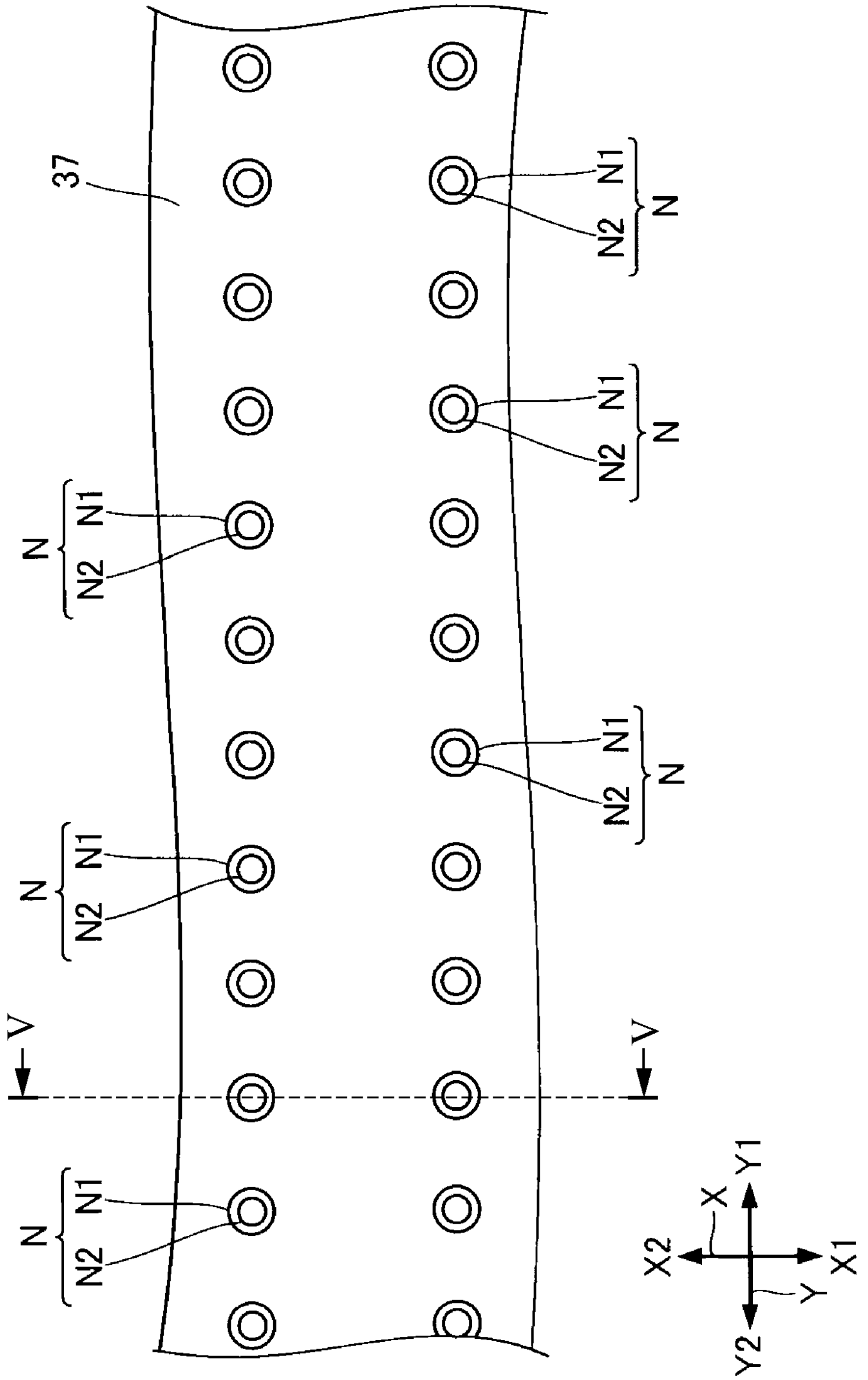
FIG. 4 is a plan view of a nozzle substrate shown in FIG. 3.
Figure 5:
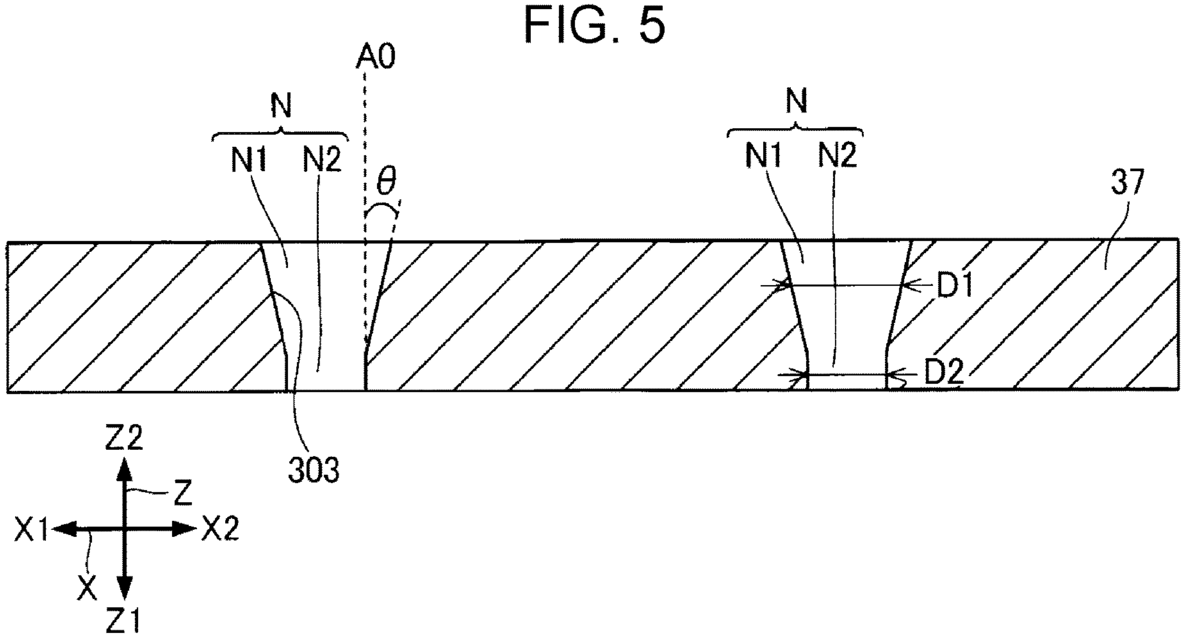
FIG. 5 is an enlarged cross-sectional view of a nozzle hole of the nozzle substrate shown in FIG. 4.

FIG. 4 is a plan view of the nozzle substrate 37 shown in FIG. 3. FIG. 5 is an enlarged view of a portion of the nozzle substrate 37 shown in FIG. 4. The nozzle substrate 37 shown in FIGS. 4 and 5 is configured of a semiconductor substrate such as a P-type single crystal silicon substrate having a crystal orientation 100. The nozzle substrate 37 has a first surface 301 and a second surface 302. The first surface 301 is a surface on a side of the pressure chamber substrate 32. The second surface 302 is a surface opposite to the first surface 301.

The nozzle substrate 37 includes a plurality of nozzles N. As described above, the nozzles N are separated from each other and arranged along the Y axis. Each nozzle N is a hole extending in the Z1 direction. The Z2 direction of the nozzle N is an ink inflow side, and the Z1 direction of the nozzle N is an ink outflow side.

The nozzle N has a tapered hole portion N1 and a cylindrical hole portion N2. The tapered hole portion N1 and the cylindrical hole portion N2 are coupled to each other. Each planar shape of the tapered hole portion N1 and the cylindrical hole portion N2 is circular.

The tapered hole portion N1 is provided on the ink inflow side of the cylindrical hole portion N2. The tapered hole portion N1 is tapered from the ink inflow side to the ink outflow side. An opening area of the tapered hole portion N1 becomes narrower from the ink inflow side to the ink outflow side. Therefore, a width D1 of the tapered hole portion N1 gradually decreases toward the cylindrical hole portion N2. The width D1 is a diameter.

A tapered angle θ of the tapered hole portion N1 is 4° or more and 20° or less. The tapered angle θ is an angle formed by a normal line A0 of the first surface 301 and an inner wall surface 303 forming the tapered hole portion N1.

When the tapered angle θ is smaller than the above-described lower limit value, there is a concern that the flow path resistance becomes too large and the ink speed decreases. When the tapered angle θ is larger than the above-described upper limit value, there is a concern that the meniscus becomes unstable. As a result, there is a concern that air bubbles are caught and an ink discharge direction is not determined. Accordingly, there is a concern that the print quality is affected, and there is a concern that strict management is required. On the other hand, by providing the tapered hole portion N1 in which the tapered angle θ is within the above range, it is possible to provide the nozzle substrate 37 excellent in discharge performance. Accordingly, it is possible to provide the liquid discharging head 3 excellent in print quality. However, for the above reasons, the tapered angle of the tapered hole portion N1 is preferably 4° or more and 20° or less, but the tapered angle is not always essential.

In addition, since the nozzle substrate 37 is a P-type single crystal silicon substrate, it is easy to form the tapered hole portion N1 having the tapered angle θ within the above range.

An opening area of the cylindrical hole portion N2 is constant. Therefore, a width D2 of the cylindrical hole portion N2 is constant. The width D2 is a diameter. The width W2 of the cylindrical hole portion N2 and the width W1 of an end of the tapered hole portion N1 on the ink outflow side are equal to each other. Therefore, there is no large level difference at a coupling portion between the cylindrical hole portion N2 and the tapered hole portion N1. Therefore, it is easy to avoid the occurrence of turbulence of the ink and the stagnation of the flow of the ink. Accordingly, it is possible to suppress a concern that problems in printing quality such as dot omission occur.

The cylindrical hole portion N2 is essential to determine the ink discharge direction and to stabilize the discharge of the ink. The width W2 of the cylindrical hole portion N2 is not particularly limited, but preferably 5 μm or more and 50 μm or less. When the width W2 is larger than 50 μm, there is a concern that air bubbles are easily mixed in.

According to the liquid discharging head 3 provided with the nozzle substrate 37 having such nozzles N, air bubble emission properties are very excellent and printing is possible with almost no need for cleaning. In addition, according to the liquid discharging head 3 provided with the nozzle substrate 37, the power efficiency is excellent and the power can be utilized to the maximum. Therefore, it is possible to provide the liquid discharging head 3 with very high performance.

1-4. Method of Forming Nozzle N

Figure 6:
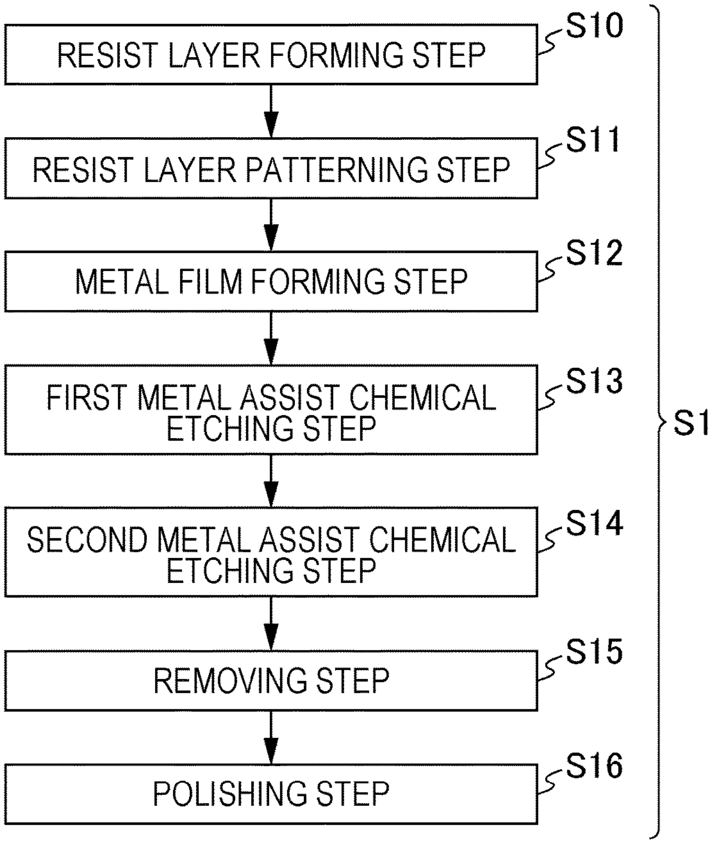
FIG. 6 is a diagram showing a flow of a method of manufacturing the nozzle substrate shown in FIG. 3.

FIG. 6 is a diagram showing a flow of a method of forming a nozzle N shown in FIG. 3. A method of manufacturing a liquid discharging head includes a method of manufacturing a nozzle substrate 37. The method of manufacturing a nozzle substrate 37 includes the method of forming a nozzle N. As shown in FIG. 6, the method of forming a nozzle N includes a first step S1. In the first step S1, as will be described later, metal assist chemical etching is used. The metal assist chemical etching is abbreviated as MACE obtained by taking the initials of metal-assisted chemical etching. By using the metal assist chemical etching, it is possible to realize the nozzle N having a configuration that is difficult to process by the method in the related art.

As shown in FIG. 6, the first step S1 includes a resist layer forming step S10, a resist layer patterning step S11, a metal film forming step S12, a first metal assist chemical etching step S13, a second metal assist chemical etching step S14, a removing step S15, and a polishing step S16.

FIGS. 7A-7E are views for describing steps from the resist layer forming step S10 to the second metal assist chemical etching step S14 of FIG. 6. First, for example, the nozzle substrate 37, which is a semiconductor substrate such as a P-type single crystal silicon substrate having the crystal orientation 100, is prepared. The nozzle substrate 37 includes the first surface 301 and the second surface 302.

Figure 7A:
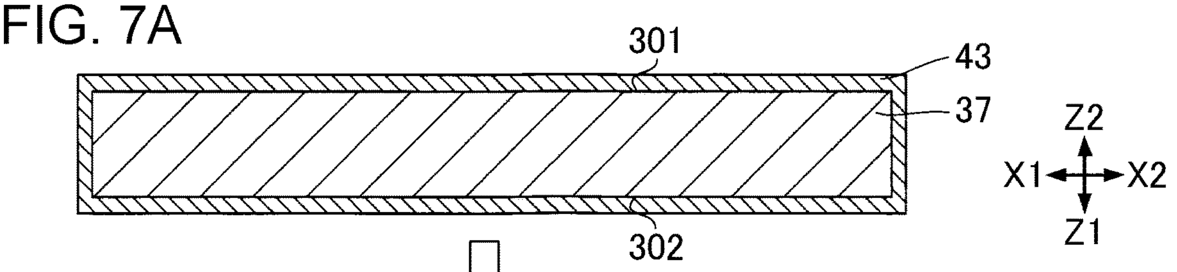
FIGS. 7A-7E are views for describing steps from a resist layer forming step to a second metal assist chemical etching step of FIG. 6.

FIG. 7A is a view for describing the resist layer forming step S10. As shown in FIG. 7A, in the resist layer forming step S10, a resist layer 43 is formed on an outer surface of the nozzle substrate 37. Therefore, the resist layer 43 is formed on the first surface 301 and the second surface 302. The resist is applied onto the outer surface of the nozzle substrate 37, and the resist layer 43 is formed by using centrifugal force. A thickness of the resist layer 43 is not particularly limited, but is, for example, 1 μm or more and 3 μm or less.

Figure 7B:
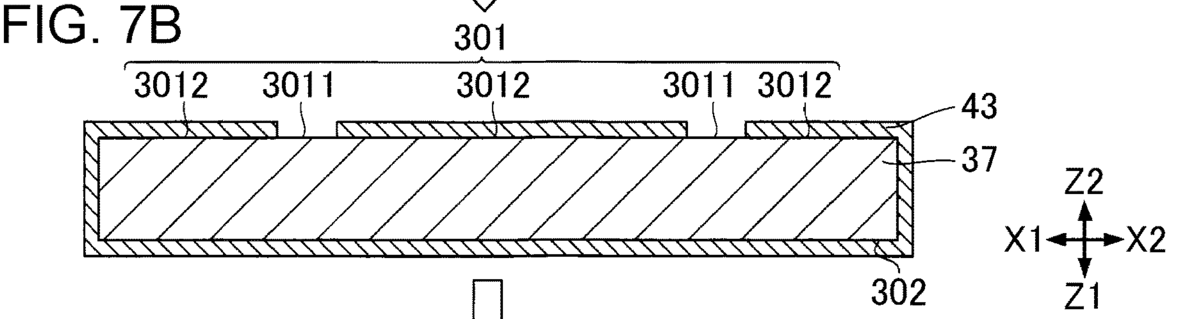

FIG. 7B is a view for describing the resist layer patterning step S11. As shown in FIG. 7B, in the resist layer patterning step S11, the resist layer 43 is patterned by removing a portion of the resist layer 43.

The first surface 301 of the nozzle substrate 37 includes a first portion 3011 and a second portion 3012. The first portion 3011 is a portion corresponding to the nozzle N. The second portion 3012 is a portion that does not correspond to the nozzle N. The first portion 3011 is a portion from which the resist is removed for the metal assist chemical etching described later. The second portion 3012 is a portion that is not removed and is protected in order to protect the substrate from a chemical solution of the metal assist chemical etching. In the resist layer patterning step S11, the resist layer is opened at the first portion 3011 to expose a semiconductor substrate surface. On the other hand, the resist layer 43 is patterned not to be opened at the second portion 3012.

Figure 7C:
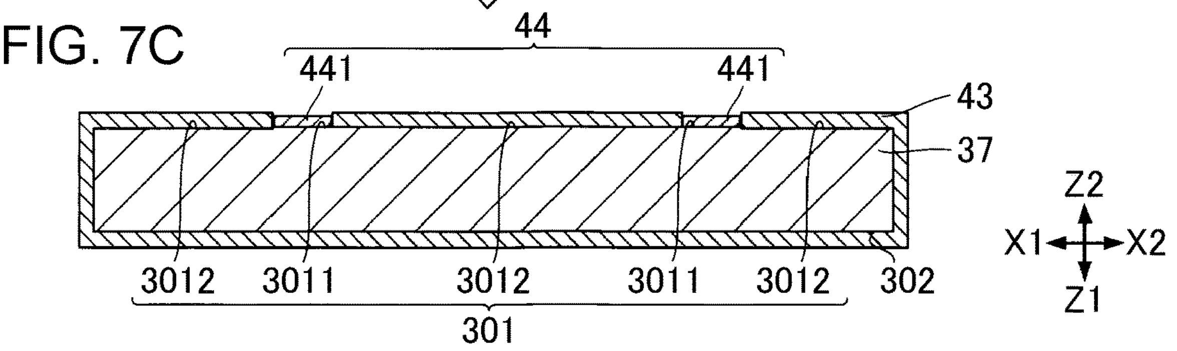

FIG. 7C is a view for describing the metal film forming step S12. As shown in FIG. 7C, in the metal film forming step S12, the metal film 44 is formed on the first surface 301 of the nozzle substrate 37. In the present embodiment, the metal film 44 is formed on the first surface 301 by electroless plating (substituted plating) using the resist layer 43 as a mask. The metal film 44 is formed on the first portion 3011 and is not formed on the second portion 3012. That is, using a difference in the ionization tendency between the semiconductor material and the plated metal, atoms on the semiconductor substrate surface are dissolved in the first portion 3011 of the semiconductor substrate surface, the electrons thereof are received, and the metal film 44 precipitates to form a metal film. On the other hand, a metal film is not formed on the second portion 3012 covered with a resin film. Therefore, the metal film 44 overlaps the first portion 3011 and does not overlap the second portion 3012, in a plan view. The metal film 44 includes a plurality of portions 441. Each portion 441 is in contact with the first portion 3011 of the first surface 301 and corresponds to the nozzle N.

By using the electroless plating, the number of pre-steps performed before the metal film forming step S12 can be reduced. Specifically, the pre-step may be only the formation of the resist layer 43 used as a mask in the electroless plating. Since the number of pre-steps can be reduced, the formation time of the nozzle substrate 37 can be shortened.

In addition, the metal film 44 also includes, for example, platinum, gold, silver, ruthenium, palladium, molybdenum, chromium, copper, tantalum, titanium, or oxides such as iridium and ruthenium.

Figure 7D:
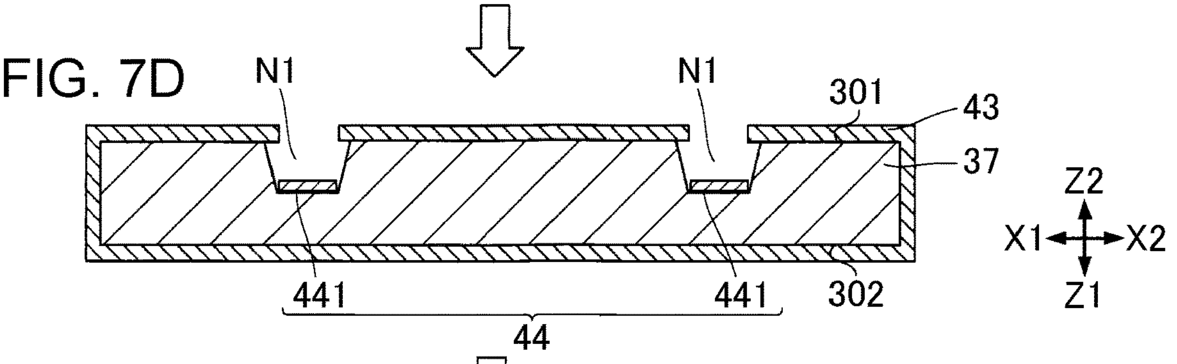

FIG. 7D is a view for describing the first metal assist chemical etching step S13. As shown in FIG. 7D, in the first metal assist chemical etching step S13, a portion of the nozzle substrate 37 is removed by the first metal assist chemical etching as metal assist chemical etching, and thereby the tapered hole portion N1 is formed. For example, metal assist chemical etching using a solution including hydrogen fluoride and an oxidizing agent is optimal.

In the metal assist chemical etching, the portion of the semiconductor material of the nozzle substrate 37 directly below the metal film 44 is oxidized by the catalytic action of the material of the metal film 44, etching of the oxide of the nozzle substrate 37 by the hydrogen fluoride solution occurs, and the adsorption between the metal film 44 and the nozzle substrate 37 due to the Coulomb force is repeated. By repeating these, it is possible to form a hole in the Z1 direction. In addition, in the present embodiment, by adjusting a ratio of the hydrogen fluoride and the oxidizing agent included in the solution, it is possible to form a hole in the Z1 direction while having the tapered angle θ. As a result, the tapered hole portion N1 having the tapered angle θ can be formed.

Figure 7E:
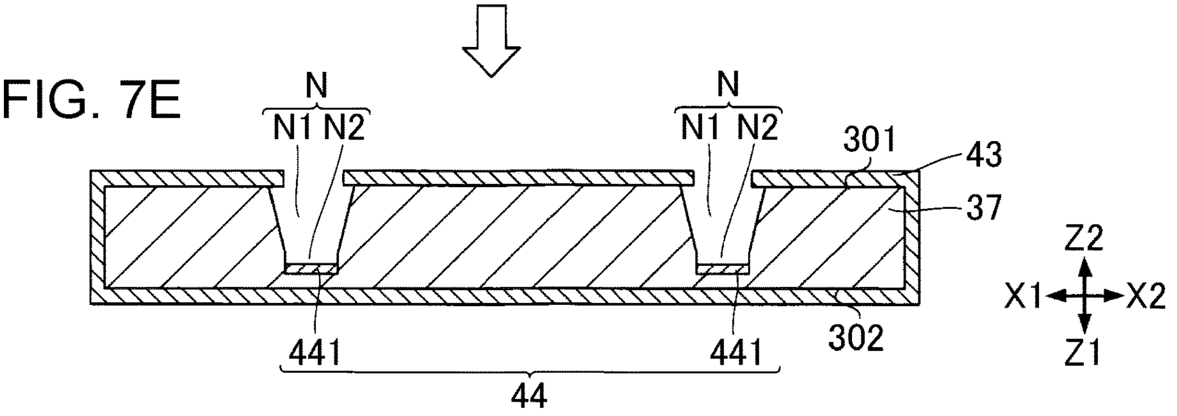

FIG. 7E is a view for describing a second metal assist chemical etching step S14. As shown in FIG. 7E, in the second metal assist chemical etching step S14, a cylindrical hole portion N2 is formed by removing a portion of the nozzle substrate 37 by the second metal assist chemical etching. Also in the present step, similar to the previous step, it is optimal to use a solution including hydrogen fluoride and an oxidizing agent, for example.

In the second metal assist chemical etching step S14, similar to the first metal assist chemical etching step S13, oxidation of the nozzle substrate 37 by the catalytic action of the material of the metal film 44, etching of the oxide of the nozzle substrate 37 by the solution, and adsorption between the metal film 44 and the nozzle substrate 37 due to the Coulomb force are repeated. By repeating these, a hole is formed in the Z1 direction. In addition, in the present embodiment, by adjusting the ratio of hydrogen fluoride and the oxidizing agent included in the solution, the cylindrical hole portion N2 having a constant width D1 can be formed.

The first metal assist chemical etching step S13 and the second metal assist chemical etching step S14 are continuously carried out. Therefore, each of the formation of the tapered hole portion N1 and the cylindrical hole portion N2 is continuously carried out. When the first metal assist chemical etching step S13 is started, a predetermined time has elapsed, and the first metal assist chemical etching is carried out on the nozzle substrate 37 to a predetermined depth, the ratio of hydrogen fluoride and the oxidizing agent included in the solution is adjusted. By adjusting the ratio, the second metal assist chemical etching step S14 is started.

Each time of the first metal assist chemical etching and the second metal assist chemical etching is determined in advance. The metal assist chemical etching is carried out under the same conditions as the first metal assist chemical etching step S13 and the second metal assist chemical etching step S14, and an etching rate is determined. Then, the etching time for drilling a predetermined depth is calculated. Based on this etching time, each time of the first metal assist chemical etching and the second metal assist chemical etching is determined.

Figure 8A:
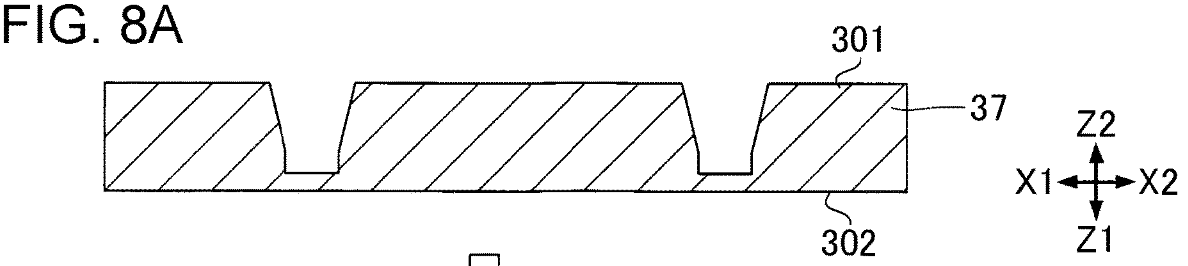
FIGS. 8A-8B are views for describing steps from a resist layer and metal film removing step to a polishing step of FIG. 6.
Figure 8B:
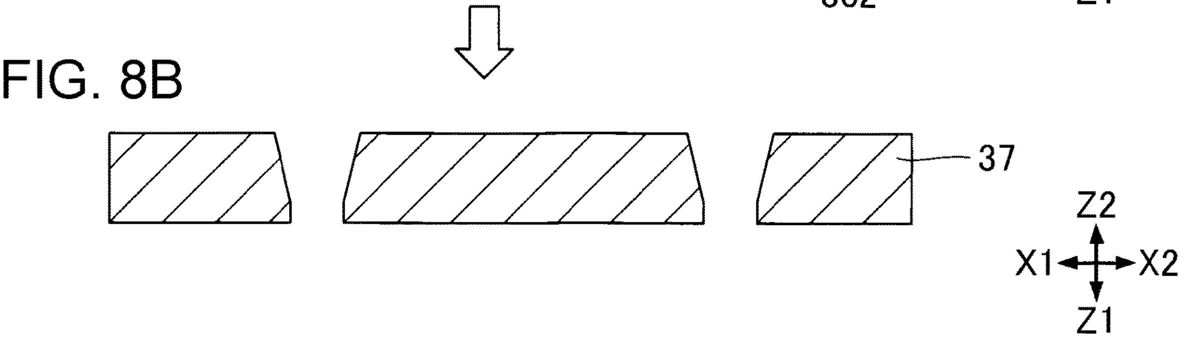

FIGS. 8A-8B are views for describing steps from the removing step S15 to the polishing step S16 of FIG. 6. As shown in FIG. 8A, in the removing step S15, the resist layer 43 and the metal film 44 are removed. The metal film 44 is removed by immersion in a dissolving solution, for example. In this step, the nozzle substrate 37 does not have a through-hole. Therefore, an opening portion is not formed on the second surface 302 of the nozzle substrate 37.

As shown in FIG. 8B, in the polishing step S16, the second surface 302 of the nozzle substrate 37 is polished, and thus a portion of the nozzle substrate 37 is removed. As a result, the nozzle N that includes the tapered hole portion N1 and the cylindrical hole portion N2 is formed. In addition, by the polishing step S16, the nozzle substrate 37 can be formed to have a desired thickness.

By having the polishing step S16, even when a portion of the metal film 44 remains without being removed in the previous step, the residue of the metal film 44 can be removed. Therefore, the residue of the metal film 44 is prevented from remaining as a foreign matter in the cylindrical hole portion N2. Therefore, the yield and quality of the nozzle N can be improved.

The polishing step S16 may be omitted. In this case, in the removing step S15, the nozzle N that is a hole penetrating the nozzle substrate 37 is formed.

Figure 9A:
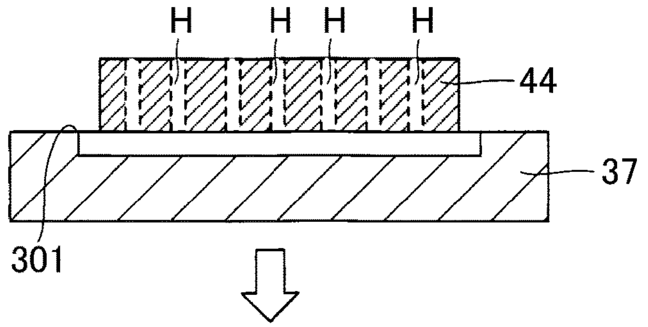
FIGS. 9A-9C are views for describing metal assist chemical etching.
Figure 9B:
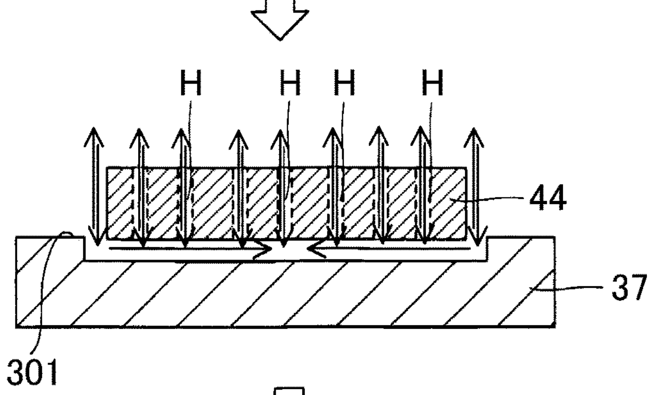
Figure 9C:
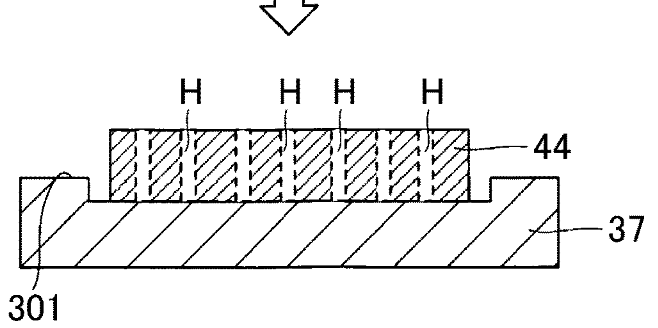

FIGS. 9A-9C are views for describing metal assist chemical etching. As shown in FIG. 9A, the above-described metal film 44 has a plurality of through-holes H. Each through-hole H penetrates the metal film 44 in the Z1 direction. The through-hole H may be formed by any method. In addition, an opening area of the through-hole H is not particularly limited as long as the solution can pass through. A thickness of the metal film 44 may be 8 nm or more and 40 nm or less, and, desirably, preferably 15 nm or more and 25 nm or less. In the MACE processing, the metal film 44 moves toward the inside of the semiconductor substrate, and thus receives a tensile stress. Since it is necessary to withstand the stress, the thicker the film, the higher the strength, the film is torn in the middle of the MACE processing, the etching shape is not deformed, and a stable etching shape can be realized. On the other hand, when the thickness is 40 nm or more, it becomes difficult to form the through-hole H, and there is a concern that etching of the semiconductor substrate directly below the metal film 44 after oxidation is not carried out.

As shown in FIG. 9A, the oxidizing agent included in the solution reacts with the metal film 44, and the nozzle substrate 37 is oxidized by the catalytic action of the material of the metal film 44. As a result, an oxide of the nozzle substrate 37 is formed. As shown by a plurality of arrows of FIG. 9B, the solution moves through the plurality of through-holes H of the metal film 44. The solution invades between the nozzle substrate 37 and the metal film 44 from the through-hole H. An oxide of the nozzle substrate 37 is dissolved by the hydrogen fluoride included in the invaded solution. As shown in FIG. 9C, the metal film 44 is adsorbed to the nozzle substrate 37 due to the Coulomb force between the metal film 44 and the nozzle substrate 37. By repeating the states shown in FIGS. 9A, 9B, and 9C, a hole is formed in the Z1 direction.

As described above, the method of manufacturing the nozzle substrate 37 includes the first step S1 of forming the nozzle N by the metal assist chemical etching. In the first step S1, in a state where the metal film 44 is formed on the first portion 3011 corresponding to the nozzle N of the first surface 301 of the nozzle substrate 37 and the metal film 44 is not formed on the second portion 3012 not corresponding to the nozzle N of the first surface 301, metal assist chemical etching is carried out.

By using the metal assist chemical etching, fine processing becomes possible, and the nozzles N can be formed with high definition. In addition, in dry etching, processing is carried out for each sheet and there is a concern that it takes a lot of processing time for one sheet, but according to the metal assist chemical etching, batch processing in which a large number of sheets can be processed in one etching tank can be carried out, and thus the processing time can be significantly reduced. In addition, by anisotropic wet etching along the crystal orientation, it is difficult to control an aspect ratio of the nozzle N, but according to the metal assist chemical etching, it is easy to form the nozzle N having a targeted aspect ratio. Therefore, by using the metal assist chemical etching, the nozzle N can be formed with high definition. Therefore, it is possible to realize the nozzle N having a targeted shape. Specifically, as described above, it is possible to realize the nozzle N that includes the tapered hole portion N1 and the cylindrical hole portion N2. Therefore, the nozzle substrate 37 having excellent discharge performance can be obtained. Accordingly, it is possible to provide the liquid discharging head 3 excellent in print quality.

According to the nozzle substrate 37 formed by such a method, air bubble emission properties are very high, and the extra ink consumption for emitting air bubbles can be remarkably reduced. On the other hand, due to the improvement in the landing position accuracy caused by the reduced flow path resistance and the improved ink speed, a high-definition image can be easily realized.

As described above, the first step S1 includes the resist layer forming step S10, the resist layer patterning step S11, and the metal film forming step S12. In the resist layer forming step S10, a resist layer 43 is formed on the first surface 301 of the nozzle substrate 37. In the resist layer patterning step S11, after forming the resist layer 43, the resist layer 43 is patterned to be opened at the first portion 3011 and not to be opened at the second portion 3012. In the metal film forming step S12, after patterning the resist layer 43, the metal film 44 is formed on the first surface 301.

By using the patterned resist layer 43, it is easy to form the metal film 44 corresponding to the first portion 3011. That is, the metal film 44 is easily formed at a targeted location. In addition, as in the present embodiment, in a case where the metal film 44 is formed by electroless plating, the patterned resist layer 43 can be suitably used as a mask.

In addition, in the first step S1, the metal assist chemical etching is preferably carried out using a solution including hydrogen fluoride and an oxidizing agent. By using hydrogen fluoride, the oxide of the nozzle substrate 37 is easily removed by etching. By using the oxidizing agent, it is possible to react with the metal film 44 to oxidize the nozzle substrate 37. Therefore, the metal assist chemical etching can be efficiently carried out.

The oxidizing agent is not particularly limited, and examples thereof include hydrogen peroxide water ($H_2O_2$), nitric acid ($HNO_3$), potassium persulfate ($KHSO_5$), potassium permanganate ($KMnO_4$), and the like. In particular, in the present embodiment, the nozzle substrate 37 is a silicon substrate. In this case, the oxidizing agent is preferably hydrogen peroxide water in order to efficiently form the oxide of the nozzle substrate 37. In addition, the type of the solution is not limited to including hydrogen fluoride and the oxidizing agent.

As described above, the metal film 44 includes platinum, gold, silver, ruthenium, palladium, molybdenum, chromium, copper, tantalum, titanium, or iridium, for example. Among these, the metal film 44 is preferably made of gold. This is because gold is particularly excellent in the catalytic reaction and can be easily removed by etching processing and the like. In addition, in a case where the oxidizing agent included in the solution is hydrogen peroxide water, the catalytic reaction of gold can be suitably exhibited, and even when the solution is dried, it is solid powdered and the yield due to particle scattering is not reduced. Therefore, it is preferable for precision processing.

Figure 10:
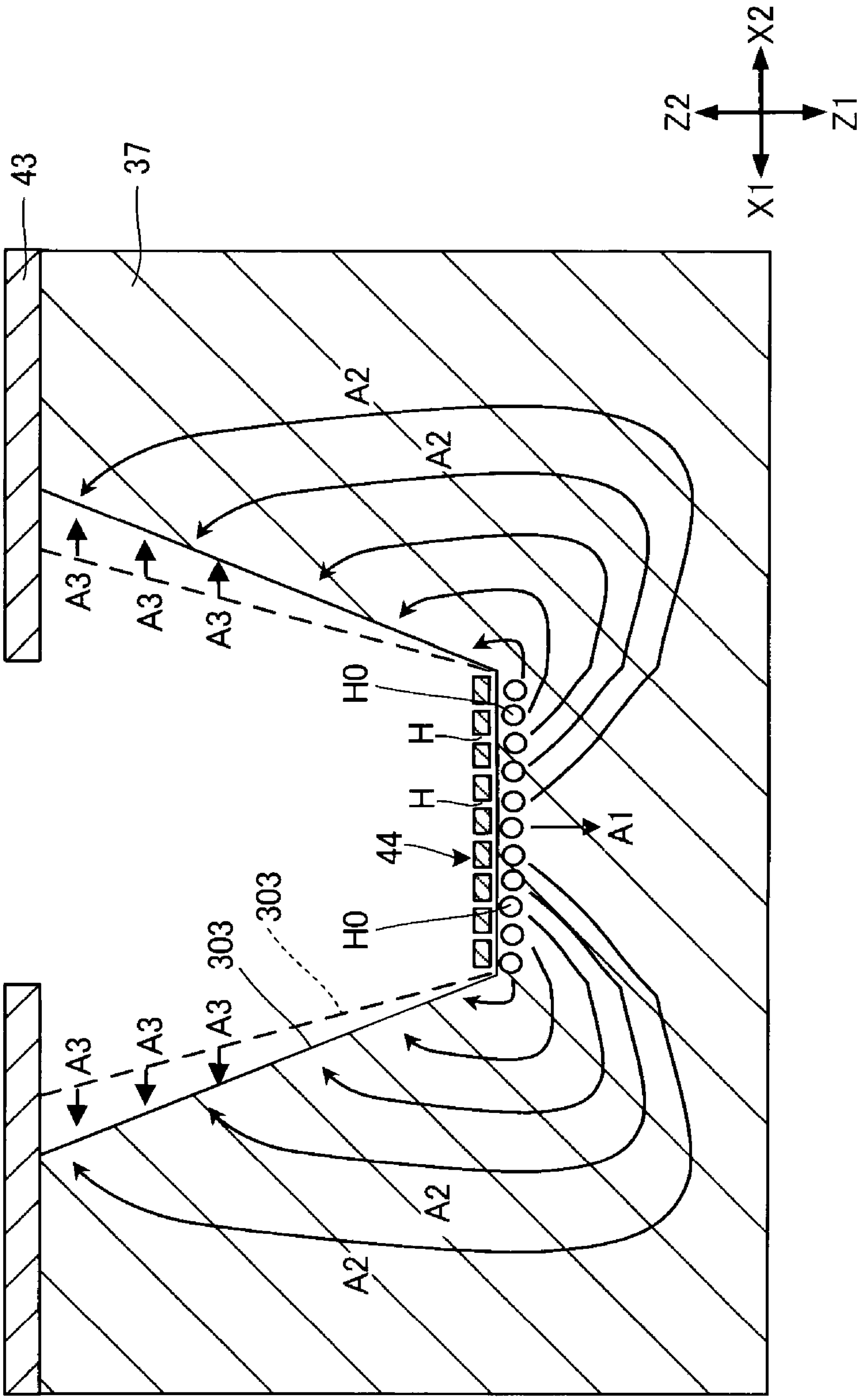
FIG. 10 is a view for describing a first metal assist chemical etching step of FIG. 6.

FIG. 10 is a view for describing the first metal assist chemical etching step S13 of FIG. 6. The oxidizing agent generates a positive hole H0 by the catalytic action of the metal film 44. The positive hole H0 oxidizes the nozzle substrate 37 directly below the metal film 44, but a part thereof scatters in the nozzle substrate 37, reaches the surface of the nozzle substrate 37, oxidizes the nozzle substrate 37 of the portion thereof, and is etched by hydrogen fluoride. An amount of this etching is increased as the metal film 44 becomes closer and decreased as the metal film 44 becomes farther. As described above, the tapered angle θ of the tapered hole portion N1 of the nozzle N can be adjusted by the ratio of the hydrogen fluoride and the oxidizing agent included in the solution. Since the tapered angle θ can be adjusted according to the ratio, a tapered hole portion N1 having a targeted tapered angle θ is easily formed. That is, the tapered angle θ can be easily controlled with high accuracy, and the yield can be easily increased.

In a case where a concentration of the oxidizing agent is increased, the tapered angle θ increases. The reason is that the oxidizing agent included in the solution reacts with the metal film 44 to generate excess positive holes H0. As shown by an arrow A1 of FIG. 10, the positive hole H0 generated from the oxidizing agent moves inside the nozzle substrate 37, and a portion of the nozzle substrate 37 directly below the metal film 44 is oxidized by the oxidizing agent. The excess positive hole H0 cannot be consumed only by the portion directly below the positive hole H0. Therefore, as shown by an arrow A2, the positive holes H0 are diffused in the nozzle substrate 37, and the inner wall surface 303 of the nozzle substrate 37 in contact with the solution is dissolved. Accordingly, as shown by an arrow A3 of FIG. 10, the inner wall surface 303 changes from a state shown by the broken line to a state shown by the solid line. As a result, the tapered angle θ becomes large.

The tapered angle θ changes due to a molar concentration volume ratio ρ of the hydrogen fluoride and the oxidizing agent. In a case where the oxidizing agent is hydrogen peroxide water, the molar concentration volume ratio ρ is represented by Formula (1).

$$\rho = [HF]/([HF] + [H_2O_2]) \tag{1}$$

[HF] of Formula (1) is the molar concentration of hydrogen fluoride included in the solution. $[H_2O_2]$ is the molar concentration of hydrogen peroxide water as the oxidizing agent included in the solution. A unit of molar concentration is mol/L.

Figure 11:
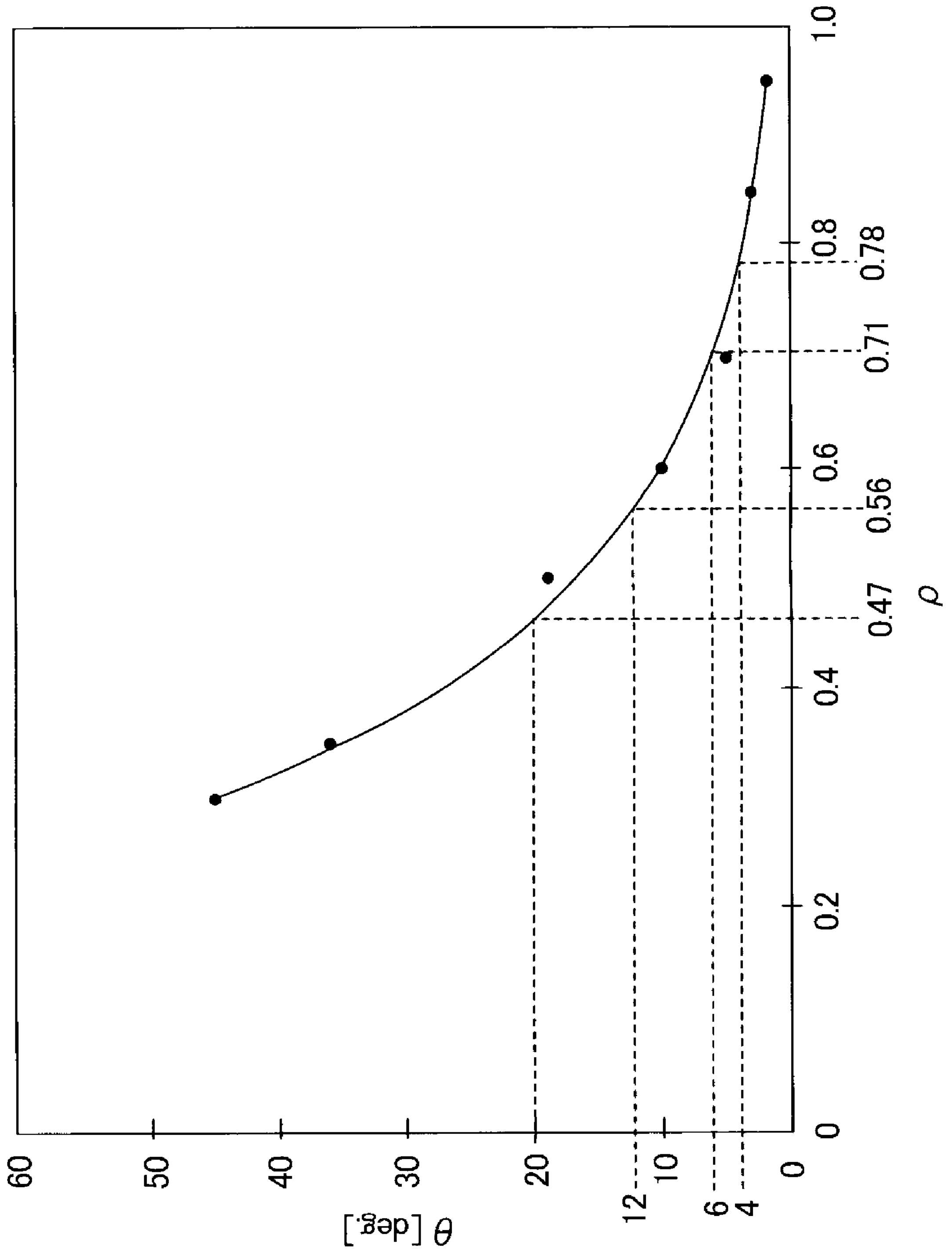
FIG. 11 is a graph showing a relationship between a molar concentration volume ratio and a tapered angle.

FIG. 11 is a graph showing a relationship between a molar concentration volume ratio ρ and a tapered angle θ. As shown in FIG. 11, the molar concentration volume ratio ρ and the tapered angle θ are related to each other. FIG. 11 shows an example of a case where the solution includes hydrogen fluoride and hydrogen peroxide water. In this example, in a case where it is desired to increase the tapered angle θ, the molar concentration of the oxidizing agent is increased. In a case where it is desired to reduce the tapered angle θ and approach 0°, the molar concentration of the oxidizing agent is decreased.

The molar concentration volume ratio ρ is preferably $0.47 \leq [HF]/([HF]+[H_2O_2]) \leq 0.78$, for example. In a case where the solution includes hydrogen fluoride and hydrogen peroxide water, since the molar concentration volume ratio ρ is within the above range, the tapered hole portion N1 having the tapered angle θ of 4° or more and 20° or less can be obtained. Therefore, it is possible to suppress a decrease in the ink speed and to suppress a concern that the meniscus becomes unstable. Therefore, it is possible to provide the nozzle substrate 37 having excellent discharge performance.

For example, it is more preferable that the molar concentration volume ratio ρ satisfies $0.56 \leq [HF]/([HF]+[H_2O_2]) \leq 0.71$. In a case where the solution includes hydrogen fluoride and hydrogen peroxide water, since the molar concentration volume ratio ρ is within the above range, the tapered hole portion N1 having the tapered angle θ of 6° or more and 12° or less can be obtained. Therefore, it is possible to provide the nozzle substrate 37 having more excellent discharge performance.

As described above, in a case where it is desired to increase the tapered angle θ, the molar concentration of the oxidizing agent is increased, and in a case where it is desired to make the tapered angle θ close to 0°, the molar concentration of the oxidizing agent is decreased. Therefore, the molar concentration volume ratio ρ is higher when the first metal assist chemical etching is carried out than when the second metal assist chemical etching carried out. By changing the molar concentration volume ratio ρ between the first metal assist chemical etching and the second metal assist chemical etching, the tapered hole portion N1 and the cylindrical hole portion N2 can be continuously formed. Therefore, it is possible to suppress a concern that a level difference between the tapered hole portion N1 and the cylindrical hole portion N2 occurs. Therefore, it is easy to avoid the occurrence of turbulence of the ink and stagnation of the ink flow. As a result, it is possible to suppress a concern that problems in printing quality such as dot omission occur.

For example, in a case where the solution includes hydrogen fluoride and hydrogen peroxide water, it is possible to obtain the tapered hole portion N1 having a tapered angle of 8° by using a solution containing 7.4 mol/L of hydrogen fluoride and 3.9 mol/L of hydrogen peroxide water.

2. Second Embodiment

Hereinafter, a second embodiment will be described. In the aspects illustrated below, elements having the same effects or functions as those of the first embodiment will be given the reference numerals used in the description of the first embodiment described above, and each of the detailed descriptions thereof will be appropriately omitted.

Figure 12:
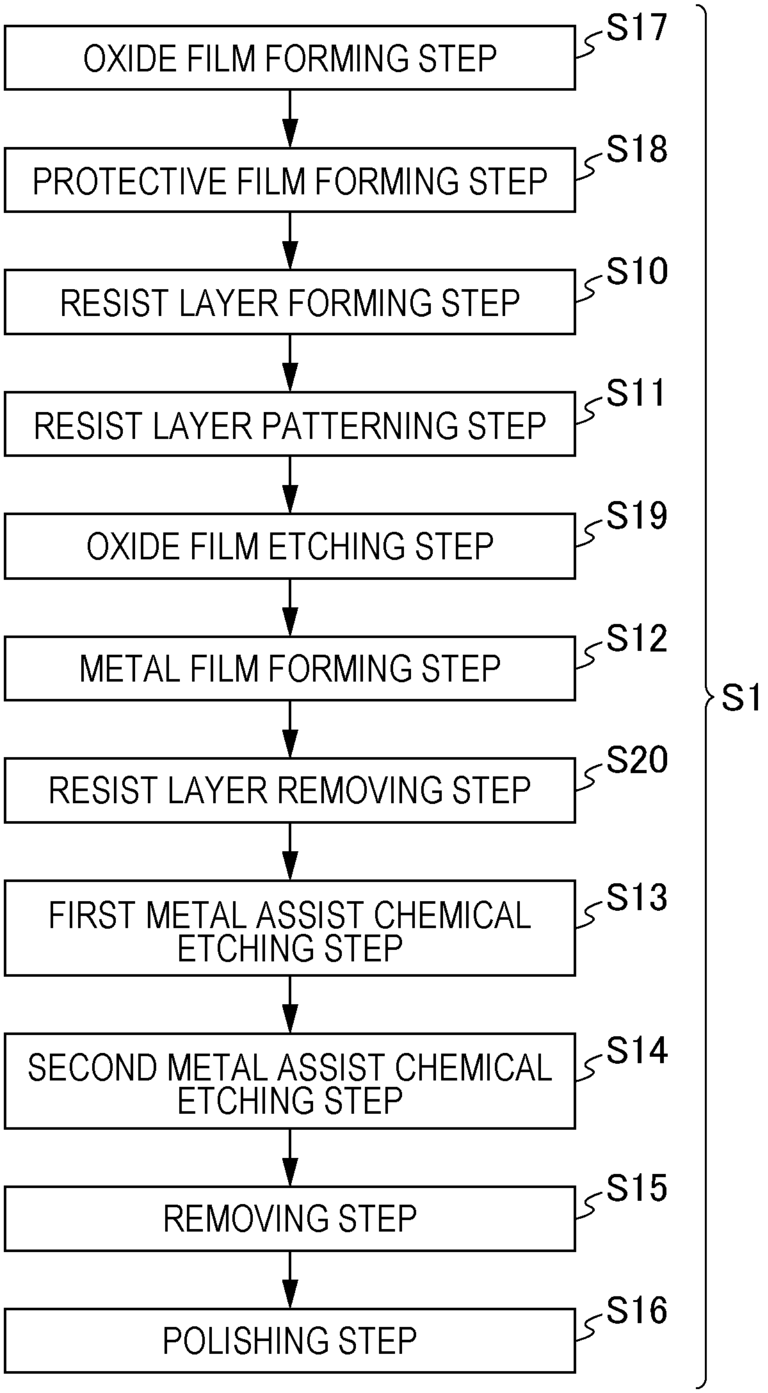
FIG. 12 is a diagram for describing a first step of a second embodiment.

FIG. 12 is a diagram for describing the first step S1 of the second embodiment. As shown in FIG. 12, the first step S1 of the present embodiment further includes an oxide film forming step S17, a protective film forming step S18, an oxide film etching step S19, and a resist layer removing step S20.

Figure 13A:
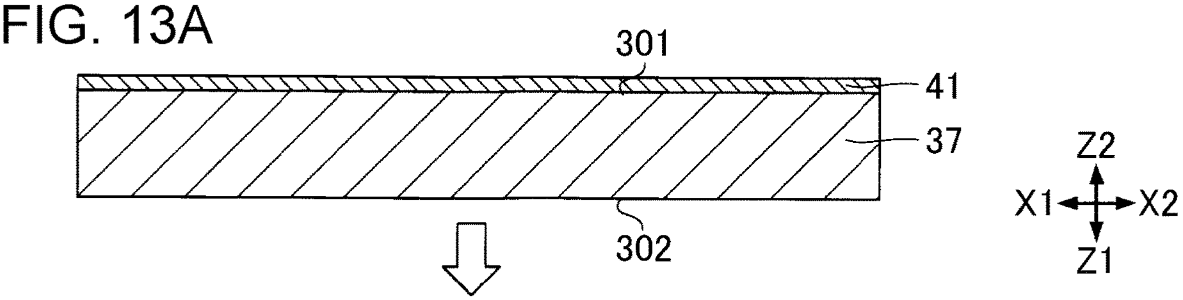
FIGS. 13A-13E are views for describing steps from an oxide film forming step to a resist layer patterning step of FIG. 12.

FIGS. 13A-13E are views for describing steps from the oxide film forming step S17 to the resist layer patterning step S11 of FIG. 12. FIG. 13A is a view for describing the oxide film forming step S17. As shown in FIG. 13A, in the oxide film forming step S17, the oxide film 41 is formed on the first surface 301 of the nozzle substrate 37. Specifically, the oxide film 41 is a silicon oxide film. For example, the oxide film 41 is formed by a chemical vapor deposition (CVD) method or thermal oxidation. Although a thickness of the oxide film 41 is not particularly limited, the thickness is 0.2 μm or more and 1.0 μm or less, for example.

Figure 13B:
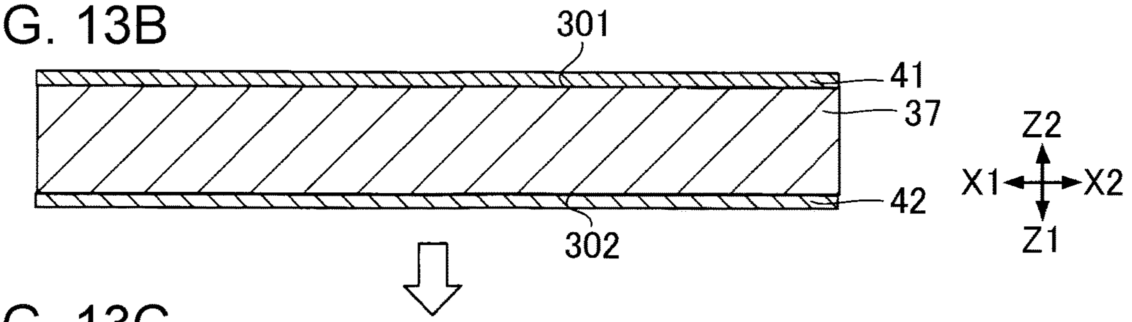

FIG. 13B is a view for describing the protective film forming step S18. As shown in FIG. 13B, in the protective film forming step S18, the protective film 42 is formed on the second surface 302 of the nozzle substrate 37. The protective film 42 is configured of diamond-like carbon and the like, for example. Diamond-like carbon is abbreviated as DLC. For example, the protective film 42 is formed by a CVD method or a sputtering method.

Figure 13C:
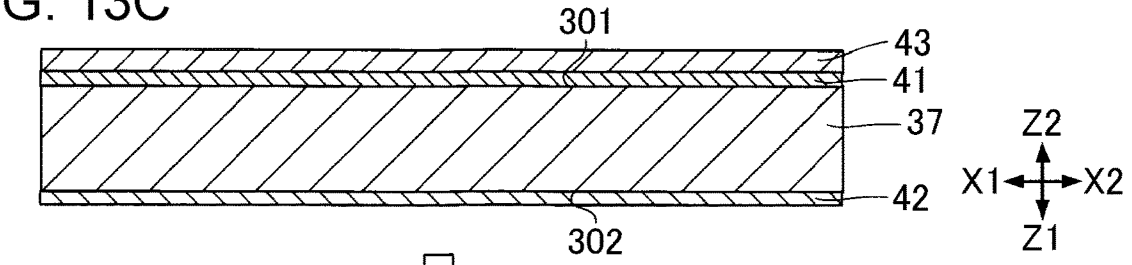

FIG. 13C is a view for describing the resist layer forming step S10. As shown in FIG. 13C, in the resist layer forming step S10, the resist layer 43 is formed on the first surface 301 of the nozzle substrate 37. Specifically, the resist layer 43 is formed on the oxide film 41 formed on the first surface 301.

Figure 13D:
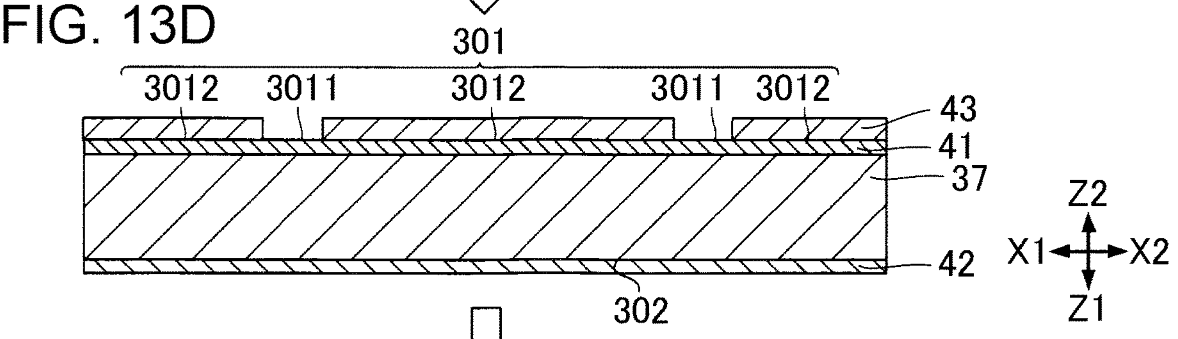
Figure 13E:
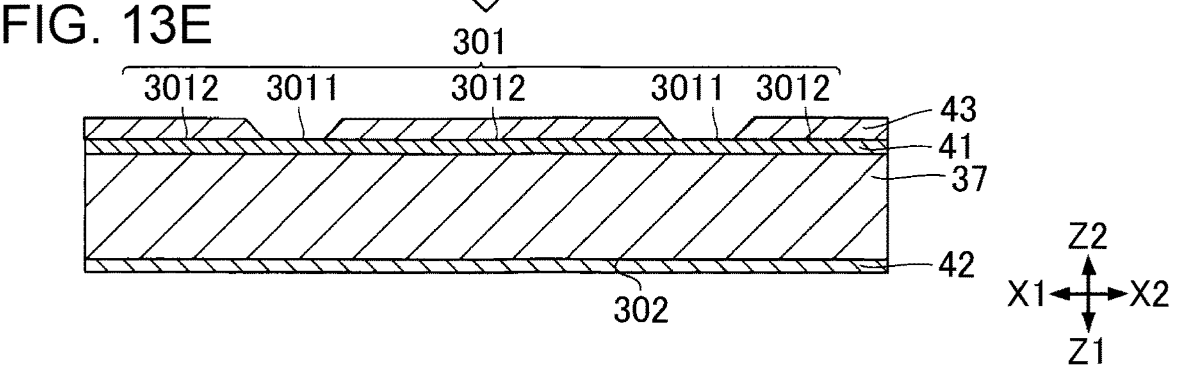

Each of FIG. 13D and FIG. 13E is a view for describing the resist layer patterning step S11. As shown in FIG. 13D, in the resist layer patterning step S11, the resist layer 43 is patterned to be opened at the first portion 3011 and not to be opened at the second portion 3012.

As shown in FIG. 13E, after patterning the resist layer 43, reflow base is carried out. As a result, the patterned resist layer 43 is in a state in which a surface in the Z2 direction is narrower than a surface in the Z1 direction due to the surface tension.

FIGS. 14A-14E are views for describing steps from the oxide film etching step S19 to the second metal assist chemical etching step S14 in FIG. 12.

Figure 14A:
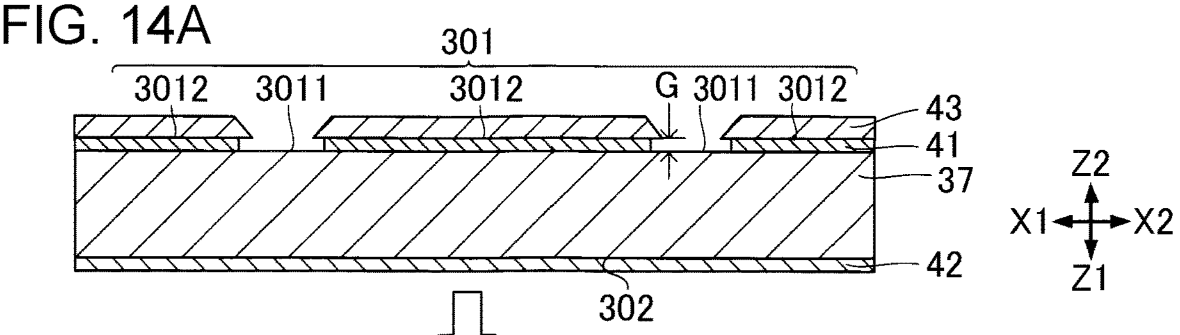
FIGS. 14A-14E are views for describing steps from an oxide film etching step to a second metal assist chemical etching step of FIG. 12.

FIG. 14A is a view for describing the oxide film etching step S19. As shown in FIG. 14A, in the oxide film etching step S19, the oxide film 41 is patterned by removing a portion of the oxide film 41 by etching. For example, the portion of the oxide film 41 is removed by wet etching using buffered hydrofluoric acid with the resist layer 43 as a mask. The buffered hydrofluoric acid is abbreviated as BHF.

In the oxide film etching step S19, a gap G is formed between the first surface 301 and the resist layer 43. That is, in the oxide film etching step S19, the portion of the oxide film 41 is removed to such an extent that the gap G is formed. In a case where the nozzle substrate 37 includes silicon, the gap G is easily formed by carrying out wet etching using hydrofluoric acid. In addition, by forming the gap G, the patterned oxide film 41 is covered with the patterned resist layer 43 in a plan view.

Figure 14B:
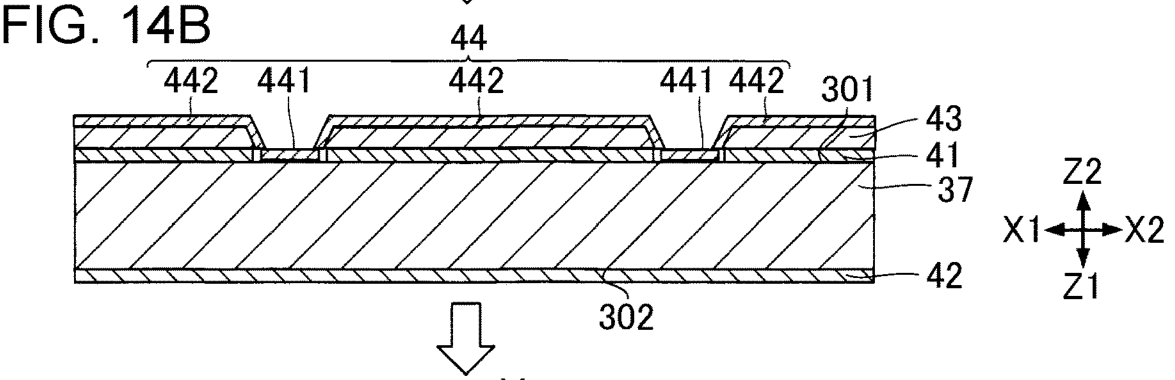

FIG. 14B is a view for describing the metal film forming step S12. As shown in FIG. 14B, in the metal film forming step S12, the metal film 44 is formed on the first surface 301 of the nozzle substrate 37. Specifically, the metal film 44 is formed on the resist layer 43 on the first surface 301.

As described above, the oxide film 41 is provided between the first surface 301 and the resist layer 43. In addition, the gap G is formed between the first surface 301 and the resist layer 43. Therefore, the metal film 44 includes the portion 441 in contact with the first surface 301 and the portion 442 in contact with the resist layer 43. The portion 441 and the portion 442 are not continuous and are divided.

Figure 14C:
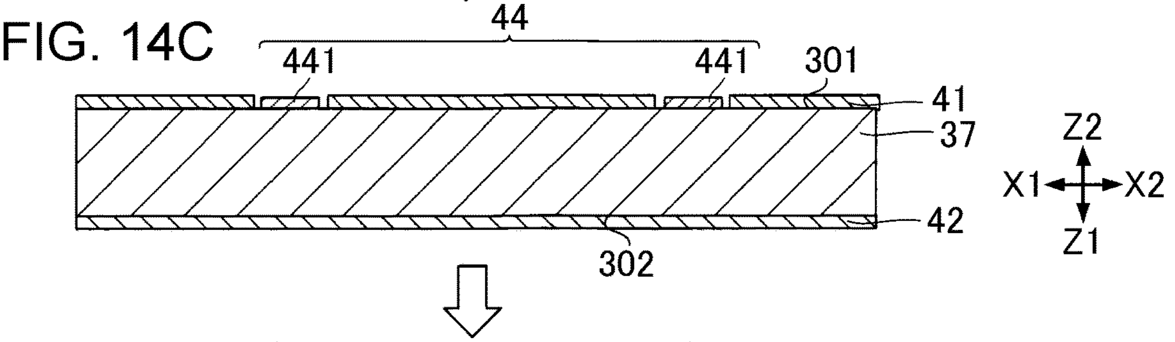

FIG. 14C is a view for describing the resist layer removing step S20. As shown in FIG. 9C, the resist layer 43 is removed in the resist layer removing step S20. Along with this removal, the portion 442 of the metal film 44 that is in contact with the resist layer 43 is also removed at the same time. As a result, the metal film 44 configured of the plurality of portions 441 is formed on the first surface 301.

In this step, the metal film 44 is formed on the first portion 3011 and is not formed on the second portion 3012. Therefore, the metal film 44 overlaps the first portion 3011 and does not overlap the second portion 3012 in a plan view.

Figure 14D:
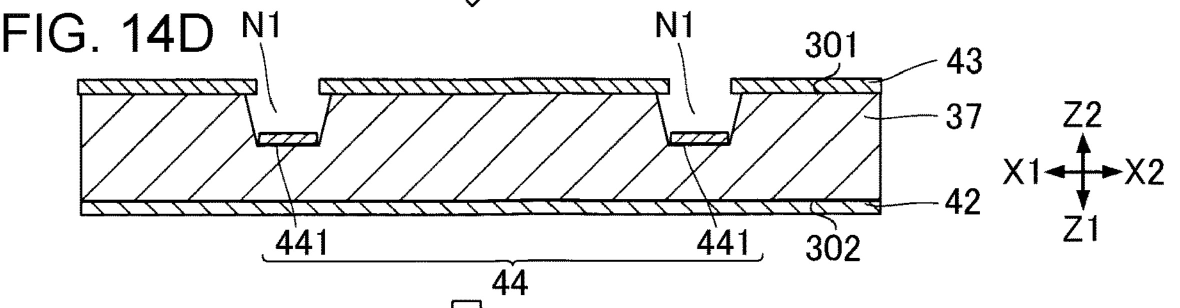

FIG. 14D is a view for describing the first metal assist chemical etching step S13. As shown in FIG. 14D, in the first metal assist chemical etching step S13, a portion of the nozzle substrate 37 is removed by the first metal assist chemical etching to form the tapered hole portion N1.

Figure 14E:
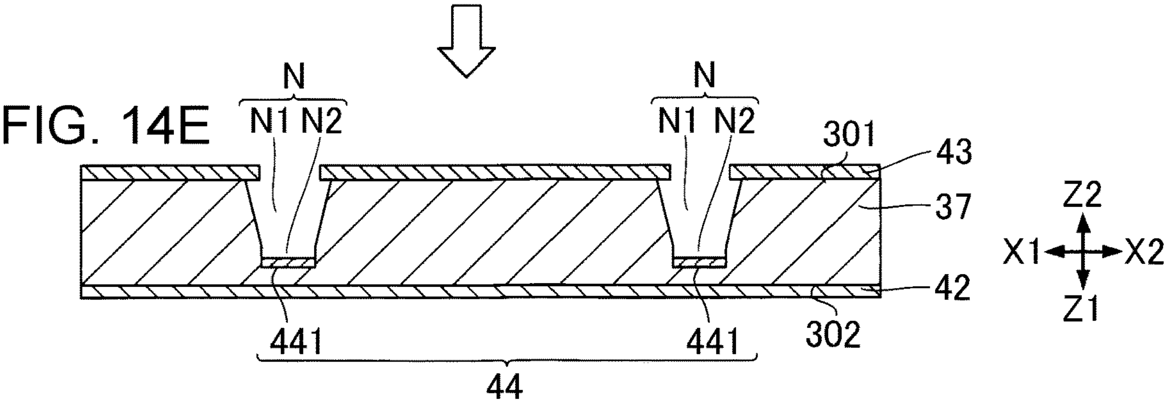

FIG. 14E is a view for describing the second metal assist chemical etching step S14. As shown in FIG. 14E, the cylindrical hole portion N2 is formed by removing a portion of the nozzle substrate 37 by the second metal assist chemical etching. The first metal assist chemical etching step S13 and the second metal assist chemical etching step S14 are continuously carried out.

Although not illustrated, after the second metal assist chemical etching step S14, the removing step S15 is carried out. In the removing step S15, the oxide film 41, the protective film 42, and the metal film 44 are removed. The protective film 42 is removed by plasma ashing, for example. After the removing step S15, the polishing step S16 is carried out. In the polishing step S16, the second surface 302 of the nozzle substrate 37 is polished, and thus a portion of the nozzle substrate 37 is removed. As a result, the nozzle N that includes the tapered hole portion N1 and the cylindrical hole portion N2 is formed.

As described above, the first step S1 of the present embodiment includes the oxide film forming step S17 and the oxide film etching step S19. In the oxide film forming step S17, the oxide film 41 is formed on the first surface 301 before forming the resist layer 43. Thereafter, the resist layer 43 is formed on the oxide film 41 in the resist layer forming step S10. In addition, in the oxide film etching step S19, after patterning the resist layer 43, a portion on the first portion 3011 of the oxide film 41 is opened by etching the oxide film 41 before forming the metal film 44.

In such a method, the resist layer 43 is formed without using the electroless plating of the first embodiment. In the present embodiment, by forming the oxide film 41 between the first surface 301 and the resist layer 43, the metal film 44 can be easily patterned in a subsequent step. In addition, the method of the present embodiment is excellent in stability in mass production. Therefore, it is possible to improve the yield. Specifically, since each of the resist layer 43 and the oxide film 41 is opened to the first portion 3011, as described above, the metal film 44 corresponding to the first portion 3011 is easily formed.

In addition, in the oxide film etching step S19, the gap G is formed between the first surface 301 and the resist layer 43 by etching the oxide film 41. By forming the gap G, the metal film 44 is more easily patterned in a subsequent step compared to a case where the gap G is not formed. By providing the gap G, the metal film 44 is more easily divided into the portion 441 in contact with the first surface 301 and the portion 442 in contact with the resist layer 43, compared to a case where the gap G is not provided. Therefore, the metal film 44 including the portion 441 in contact with the targeted first portion 3011 is easily formed.

The first step S1 includes the resist layer removing step S20. In the resist layer removing step S20, the resist layer 43 is removed after forming the metal film 44 on the first surface 301. By removing the resist layer 43, the portion 442 can be removed, and thus the metal film 44 configured of the portion 441 is formed on the first surface 301. Therefore, the patterned metal film 44 can be simply formed. According to this method, even in the metal film 44 having a fine shape, the metal film 44 having the pattern of targeted shape and disposition can be simply formed with high accuracy and with high yield.

Also in the present embodiment, the nozzle N is formed by metal assist chemical etching in the same manner as in the first embodiment. Therefore, it is possible to realize the nozzle N having a targeted shape. Specifically, as described above, it is possible to realize the nozzle N that includes the tapered hole portion N1 and the cylindrical hole portion N2.

Therefore, the nozzle substrate 37 having excellent discharge performance can be obtained. Accordingly, it is possible to provide the liquid discharging head 3 excellent in print quality.

3. Third Embodiment

Hereinafter, a third embodiment will be described. In the aspects illustrated below, elements having the same effects or functions as those of the first embodiment will be given the reference numerals used in the description of the first embodiment described above, and each of the detailed descriptions thereof will be appropriately omitted.

Figure 15:
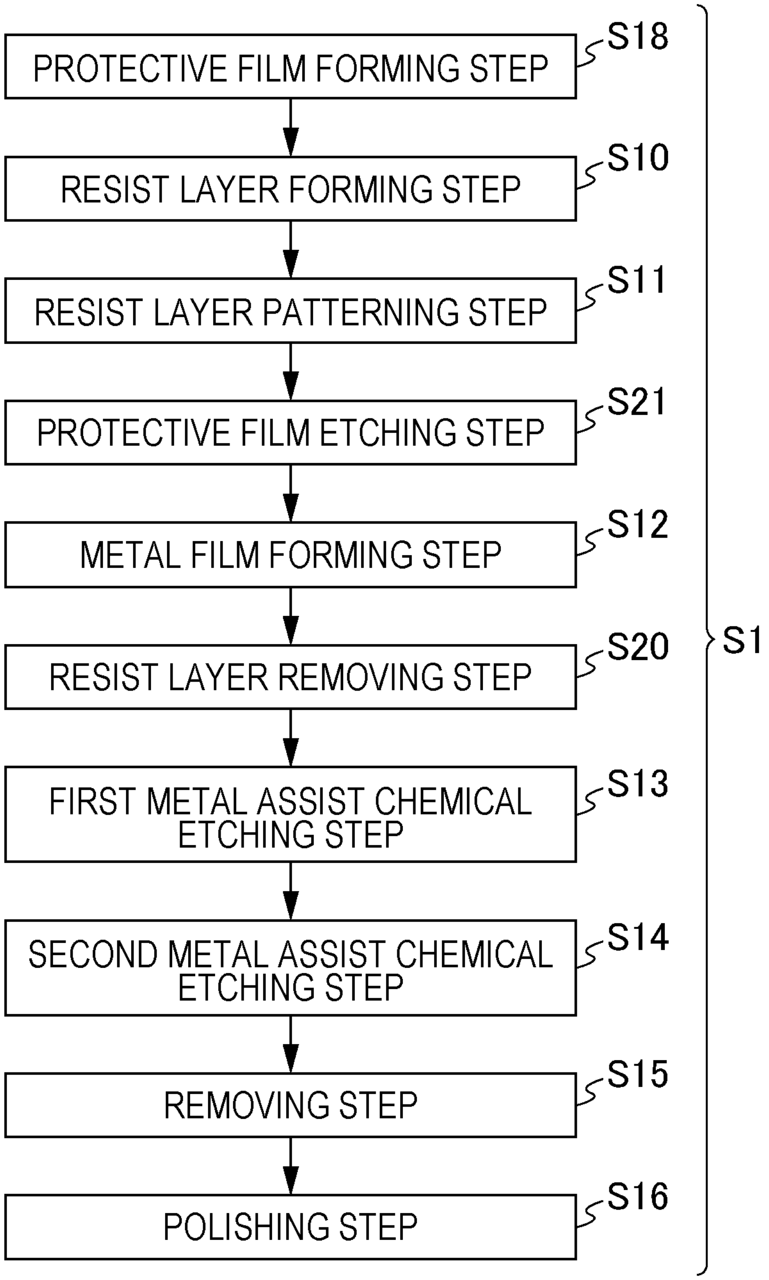
FIG. 15 is a diagram showing a flow of a method of manufacturing a nozzle substrate of a third embodiment.

FIG. 15 is a diagram showing a flow of a method of manufacturing the nozzle substrate 37 of a third embodiment. As shown in FIG. 15, the first step S1 of the present embodiment further includes the protective film forming step S18, the resist layer forming step S10, the protective film etching step S21, and the resist layer removing step S20. In addition, in the present embodiment, an electric field is carried out in the second metal assist chemical etching step S14.

FIGS. 16A-16E are views for describing steps from the protective film etching step S21 to the metal film forming step S12 of FIG. 15.

Figure 16A:
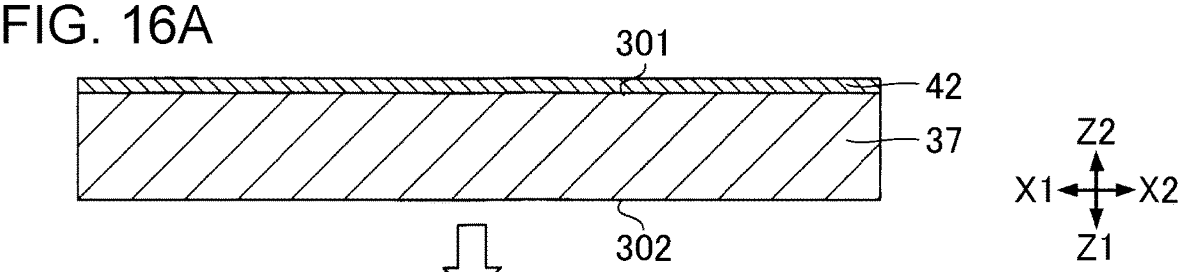
FIGS. 16A-16E are views for describing steps from a protective film etching step to a metal film forming step of FIG. 15.

FIG. 16A is a view for describing the protective film forming step S18. As shown in FIG. 16A, in the protective film forming step S18, the protective film 42 is formed on the first surface 301 of the nozzle substrate 37. Although not illustrated, the protective film 42 is also formed on the wall surface of the nozzle substrate 37. The protective film 42 is configured of diamond-like carbon and the like, for example. Diamond-like carbon is abbreviated as DLC. For example, the protective film 42 is formed by a CVD method or a sputtering method. A thickness of the protective film 42 is not particularly limited, and is 0.1 μm or more and 0.5 μm or less, for example.

Figure 16B:
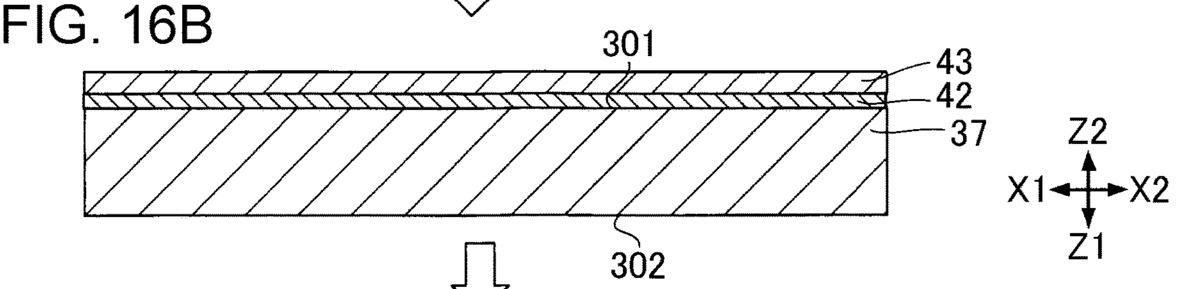

FIG. 16B is a view for describing the resist layer forming step S10. As shown in FIG. 16B, in the resist layer forming step S10, the resist layer 43 is formed on the first surface 301 of the nozzle substrate 37. Specifically, the resist layer 43 is formed on the protective film 42 formed on the first surface 301.

Figure 16C:
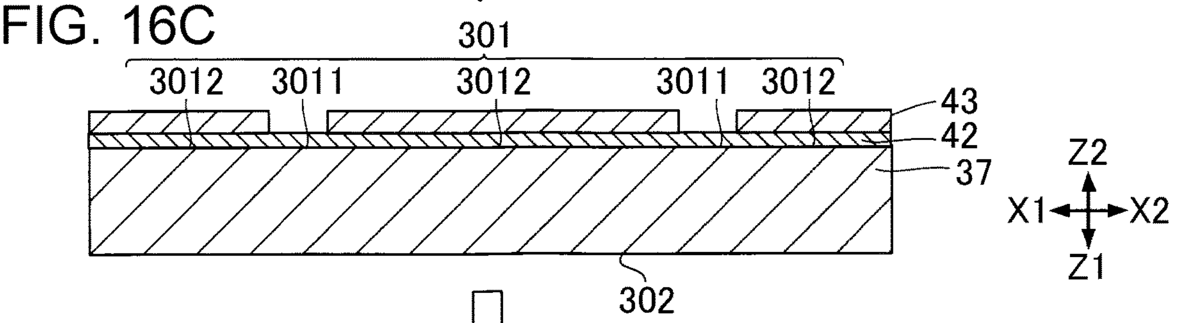
Figure 16D:
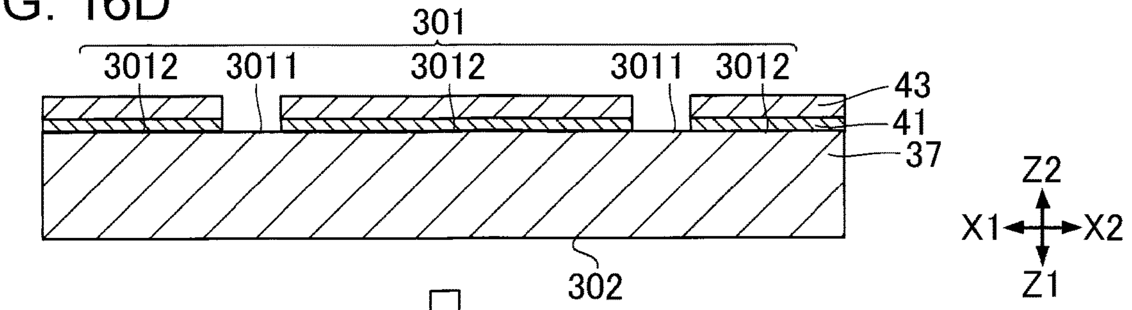

FIG. 16C is a view for describing the resist layer patterning step S11. As shown in FIG. 16D, in the resist layer patterning step S11, the resist layer 43 is patterned so as to be opened at the first portion 3011 and not to be opened at the second portion 3012.

FIG. 16D is a view for describing the protective film etching step S21. As shown in FIG. 16D, in the protective film etching step S21, in the resist layer patterning step S11, similar to the resist layer 43, the protective film 42 is patterned so as to be opened at the first portion 3011 and not to be opened at the second portion 3012. In a case where the protective film 42 is diamond-like carbon, the protective film 42 is patterned by etching using oxygen plasma.

Figure 16E:
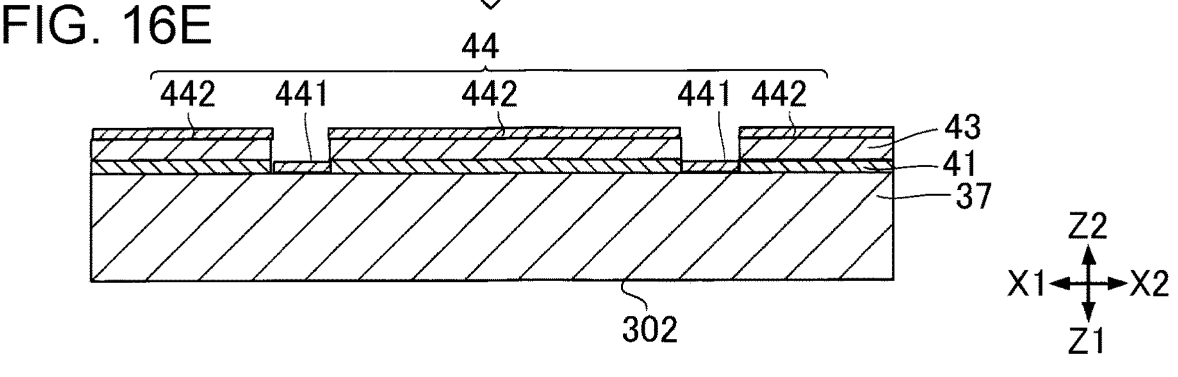

FIG. 16E is a view for describing the metal film forming step S12. As shown in FIG. 16E, in the metal film forming step S12, the metal film 44 is formed on the first surface 301 of the nozzle substrate 37. Specifically, the metal film 44 is formed on the resist layer 43 on the first surface 301. The metal film 44 includes a portion 441 in contact with the first surface 301 and a portion 442 in contact with the resist layer 43. Since the protective film 42 is provided between the first surface 301 and the resist layer 43, the portion 441 and the portion 442 are not continuous and are divided.

Figures 17A, 17B, 17C:
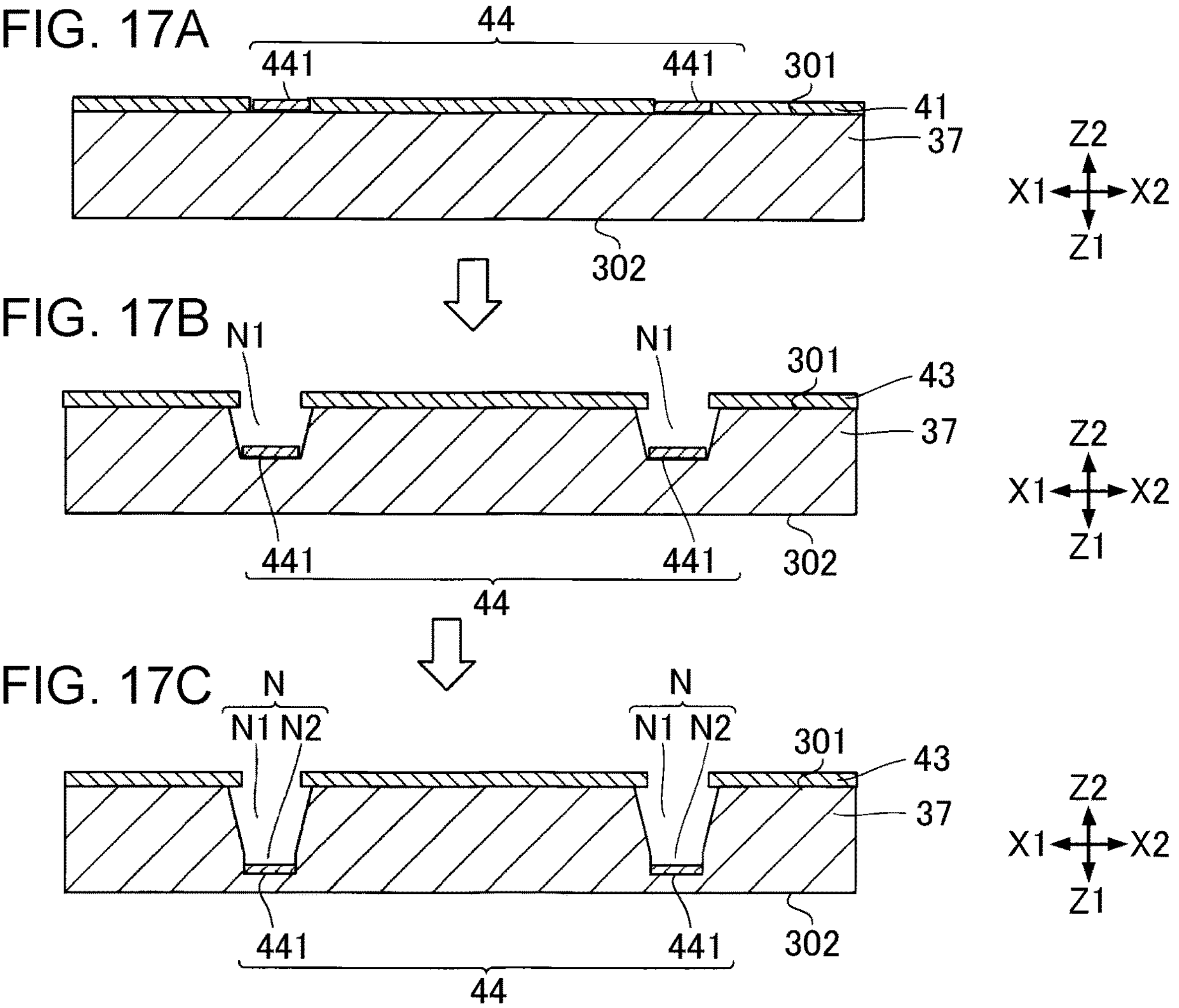
FIGS. 17A-17C are views for describing steps from a resist layer removing step to a second metal assist chemical etching of FIG. 15.

FIGS. 17A-17C are views for describing steps from the resist layer removing step S20 to the second metal assist chemical etching step S14 of FIG. 15. FIG. 17A is a view for describing the resist layer removing step S20. As shown in FIG. 17A, the resist layer 43 is removed in the resist layer removing step S20. Along with this removal, the portion 442 of the metal film 44 in contact with the resist layer 43 is also removed at the same time. As a result, the metal film 44 configured of the plurality of portions 441 is formed on the first surface 301.

FIG. 17B is a view for describing the first metal assist chemical etching step S13. As shown in FIG. 17B, in the first metal assist chemical etching step S13, the tapered hole portion N1 is formed by removing a portion of the nozzle substrate 37 by the first metal assist chemical etching.

FIG. 17C is a view for describing the second metal assist chemical etching step S14. As shown in FIG. 17C, the cylindrical hole portion N2 is formed by removing a portion of the nozzle substrate 37 by the second metal assist chemical etching. The first metal assist chemical etching step S13 and the second metal assist chemical etching step S14 are continuously carried out.

Although not illustrated, after the second metal assist chemical etching step S14, the removing step S15 is carried out. In the removing step S15, the oxide film 41, the protective film 42, and the metal film 44 are removed. The protective film 42 is removed by plasma ashing, for example.

After the removing step S15, the polishing step S16 is carried out. In the polishing step S16, the second surface 302 of the nozzle substrate 37 is polished, and thus a portion of the nozzle substrate 37 is removed. As a result, the nozzle N that includes the tapered hole portion N1 and the cylindrical hole portion N2 is formed.

Also in the present embodiment, the nozzle N is formed by metal assist chemical etching in the same manner as in the first embodiment. Therefore, it is possible to realize the nozzle N having a targeted shape. Specifically, as described above, it is possible to realize the nozzle N that includes the tapered hole portion N1 and the cylindrical hole portion N2. Therefore, the nozzle substrate 37 having excellent discharge performance can be obtained. Accordingly, it is possible to provide the liquid discharging head 3 excellent in print quality.

In addition, in the present embodiment, application of an electric field is used in the metal assist chemical etching. Specifically, when the first metal assist chemical etching is carried out, an electric field is not applied to the solution, and when the second metal assist chemical etching is carried out, an electric field is applied to the solution. By applying the electric field in this way, the positive holes H0 that are excessively generated and form tapered portions are suctioned to a back surface to prevent the formation of the tapered portions, and prevention of the tapered portions can be realized by application of an electric field without the replacement work of the liquid having a different etching solution composition. The advantage of this method is that the formation of the tapered hole portion N1 and the formation of the cylindrical hole portion N2 can be easily and continuously carried out compared to the case where the electric field is not applied.

Figure 18:
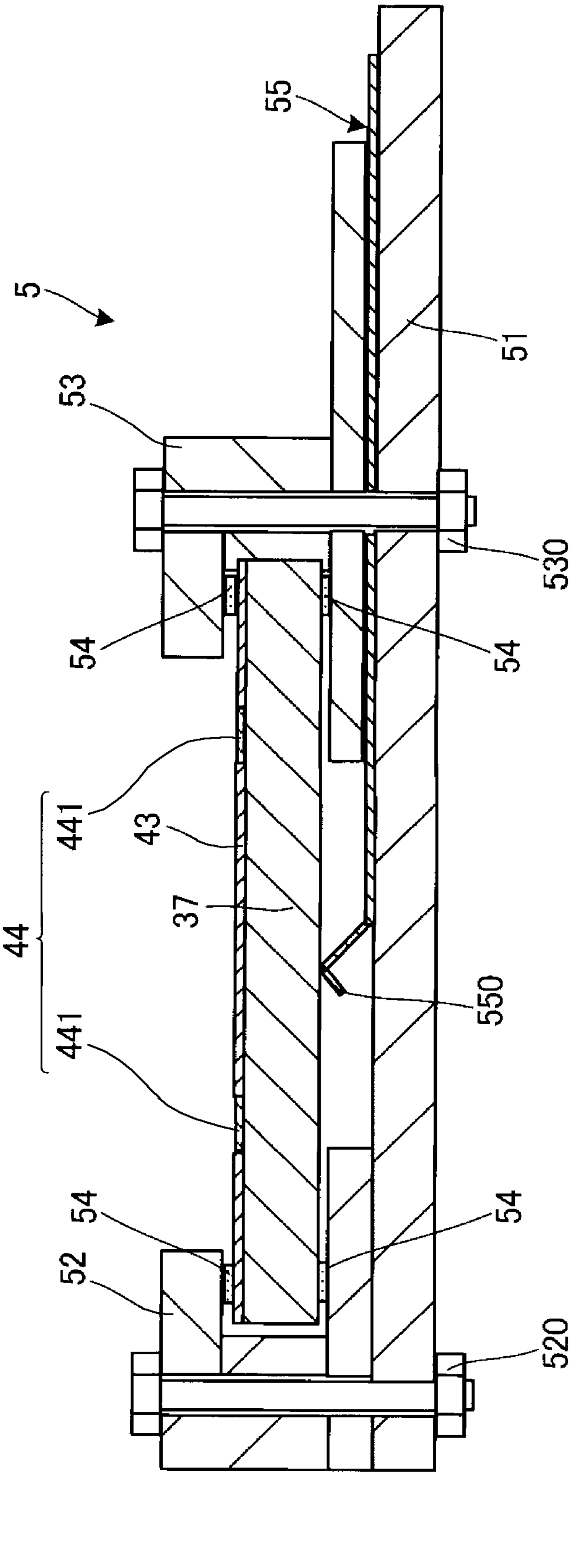
FIG. 18 is a sectional view showing a jig used in the first metal assist chemical etching step.
Figure 19:
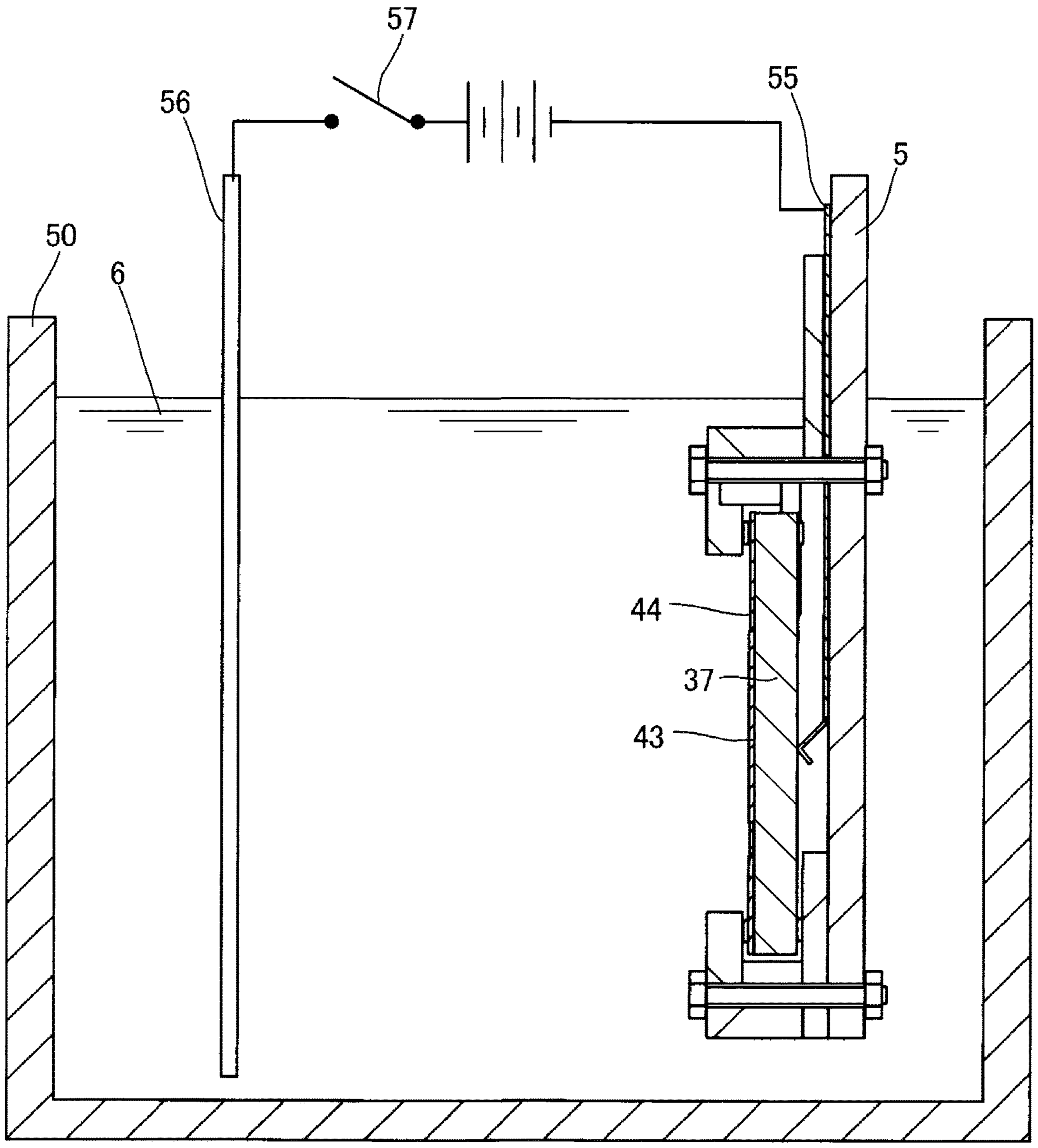
FIG. 19 is a view for describing a first metal assist chemical etching step.

FIG. 18 is a sectional view showing a jig 5 used in the first metal assist chemical etching step S13. FIG. 19 is a view for describing the first metal assist chemical etching step S13.

The jig 5 shown in FIG. 18 is used for fixing the nozzle substrate 37 in the first metal assist chemical etching step S13. The jig 5 includes a base portion 51, a first member 52, a second member 53, two screws 520 and 530, a plurality of packings 54, and an electrode 55. The base portion 51 is a flat plate-shaped member, and has two holes through which the two screws 520 and 530 penetrate. The first member 52 is a clamp that is fixed to the base portion 51 with the screw 520 having the nozzle substrate 37 interposed therein. The second member 53 is disposed to face the first member 52. The second member 53 is a clamp that is fixed to the base portion 51 with the screw 530 having the nozzle substrate 37 interposed therein. A plurality of packings 54 are provided in each of the first member 52 and the second member 53. The nozzle substrate 37 is fixed by the screws 520 and 530 in a state of being interposed between the first member 52 and the second member 53 via the plurality of packings 54.

The electrode 55 is disposed between the second member 53 and the base portion 51. The electrode 55 is fixed by the screw 530 in a state of being interposed between the second member 53 and the base portion 51. A tip end portion 550 of the electrode 55 is in contact with the second surface 302 of the nozzle substrate 37.

In the present embodiment, the second surface 302 of the nozzle substrate 37 is not covered with the protective film 42 or the resist layer 43. In this case, in the metal assist chemical etching, the second surface 302 is protected by the plurality of packings 54 such that the solution does not invade the second surface 302.

As shown in FIG. 19, in the first metal assist chemical etching step S13, a solution 6 is accommodated in an etching solution tank 50. The jig 5 that interposes the nozzle substrate 37 is disposed in the etching solution tank 50 so as to be immersed in the solution 6. In addition, an action electrode 56 is disposed in the etching solution tank 50 so as to be immersed in the solution 6. As the action electrode 56, for example, a platinum mesh electrode is used. The action electrode 56 faces the first surface 301 of the nozzle substrate 37. In addition, a negative side of a DC power source is attached to the electrode 55, and a positive side of the DC power source is attached to the action electrode 56. In such a state, the first metal assist chemical etching step S13 is carried out.

Figure 20:
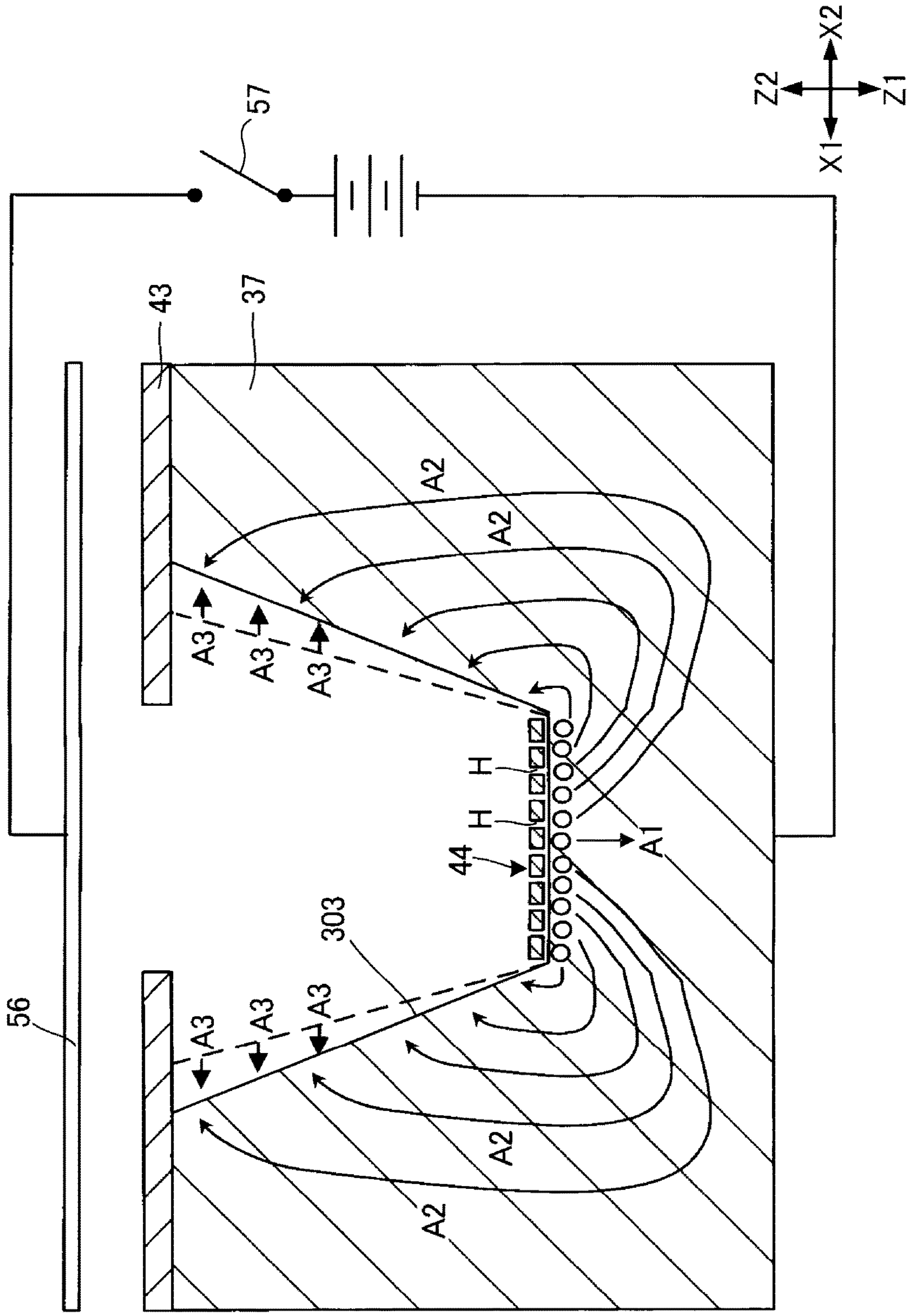
FIG. 20 is a view for describing the first metal assist chemical etching step.
Figure 21:
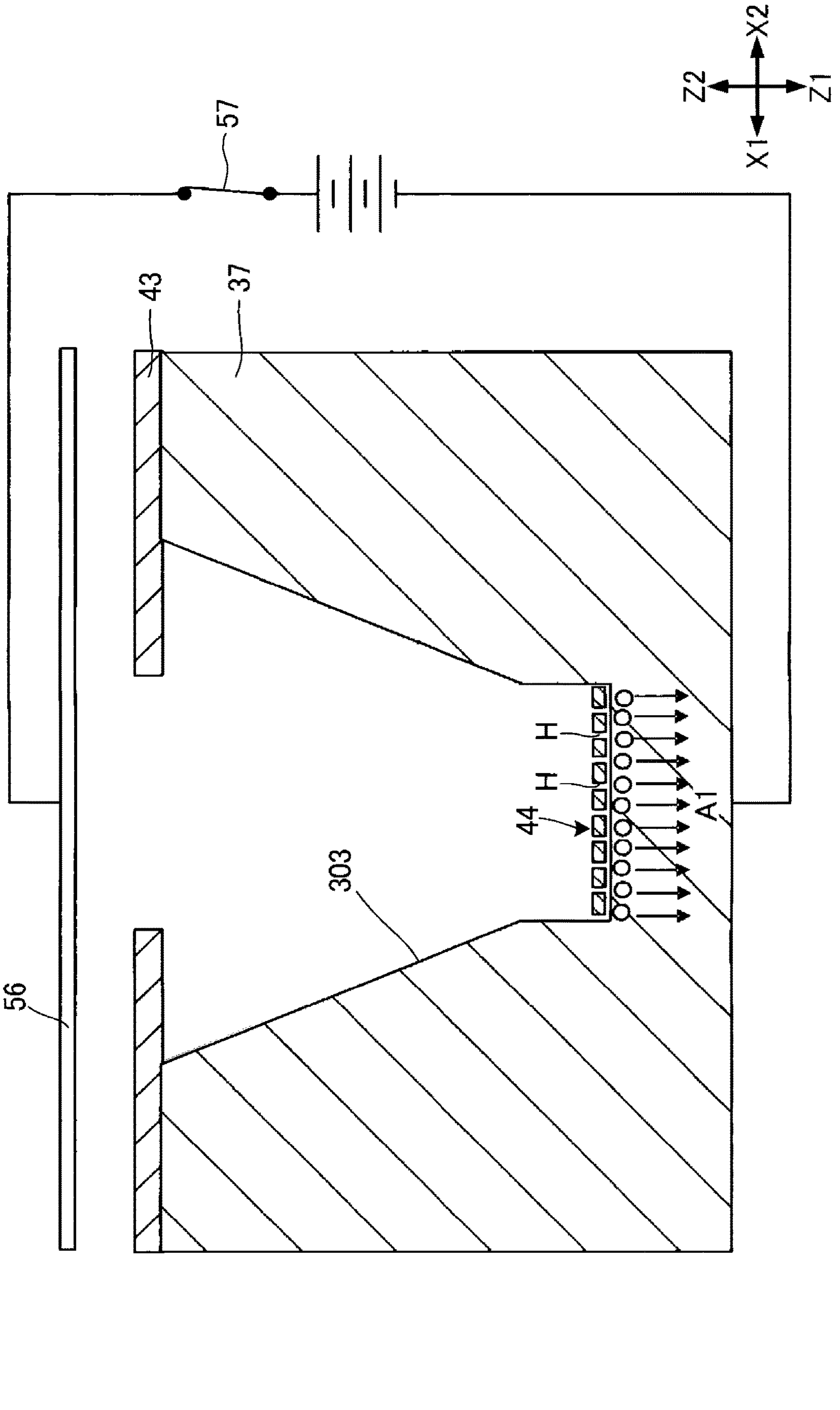
FIG. 21 is a view for describing a second metal assist chemical etching step.

FIG. 20 is a view for describing the first metal assist chemical etching step S13. FIG. 21 is a view for describing the second metal assist chemical etching step S14.

As shown in FIG. 20, in the first metal assist chemical etching step S13, a switch 57 is turned off, and an electric field is not applied to the solution. In this case, the positive hole H0 generated from the oxidizing agent moves inside the nozzle substrate 37 as shown by an arrow A1, and a portion of the nozzle substrate 37 directly below the metal film 44 is oxidized by the oxidizing agent. In addition, the positive hole H0 diffuses the nozzle substrate 37 as shown by an arrow A2, and an inner wall surface 303 of the nozzle substrate 37 in contact with the solution is dissolved. Accordingly, as shown by an arrow A3, the inner wall surface 303 changes from the state shown by the broken line to the state shown by the solid line. As a result, in the first metal assist chemical etching step S13, the tapered hole portion N1 having a tapered angle θ is formed. In addition, in the first metal assist chemical etching step S13, a molar concentration volume ratio ρ of the solution 6 in the etching solution tank 50 is set to be a desired tapered angle θ.

As shown in FIG. 21, in the second metal assist chemical etching step S14, the switch 57 is turned on, and an electric field is applied to the solution. In this case, a tapered portion is not formed, and a straight hole is formed. The cylindrical hole portion N2 is configured by the hole. For example, by applying a voltage of 4 V or more and 8 V or less, the cylindrical hole portion N2 which is a straight hole can be formed.

When the voltage is applied, the positive hole H0 having a positive charge is attracted to the second surface 302 of the nozzle substrate 37 to which a negative voltage is applied, as shown by the arrow A1. Therefore, it is suppressed that the positive hole H0 is diffused and reaches the inner wall surface 303. Therefore, as the positive hole H0 is drawn to the second surface 302, a tapered portion is not formed, and a straight hole is formed.

As described above, in a state in which the molar concentration volume ratio ρ of the solution 6 in the etching solution tank 50 is set to be a desired tapered angle θ, by switching ON and OFF of the electric field of the solution 6, the formation of the tapered hole portion N1 and the formation of the cylindrical hole portion N2 can be easily switched. Therefore, in an etching solution tank different from the etching solution tank 50, it is not necessary to separately prepare a solution of which the molar concentration volume ratio ρ is adjusted to form the cylindrical hole portion N2. Therefore, the second metal assist chemical etching step S14 can be promptly started. In addition, according to the method of the present embodiment, the formation of the tapered hole portion N1 and the formation of the cylindrical hole portion N2 can be carried out in one etching solution tank 50. For this reason, a use amount of the solution can be reduced, and the cost can be reduced.

4. Method of Manufacturing Liquid Discharging Head 3

Figure 22:
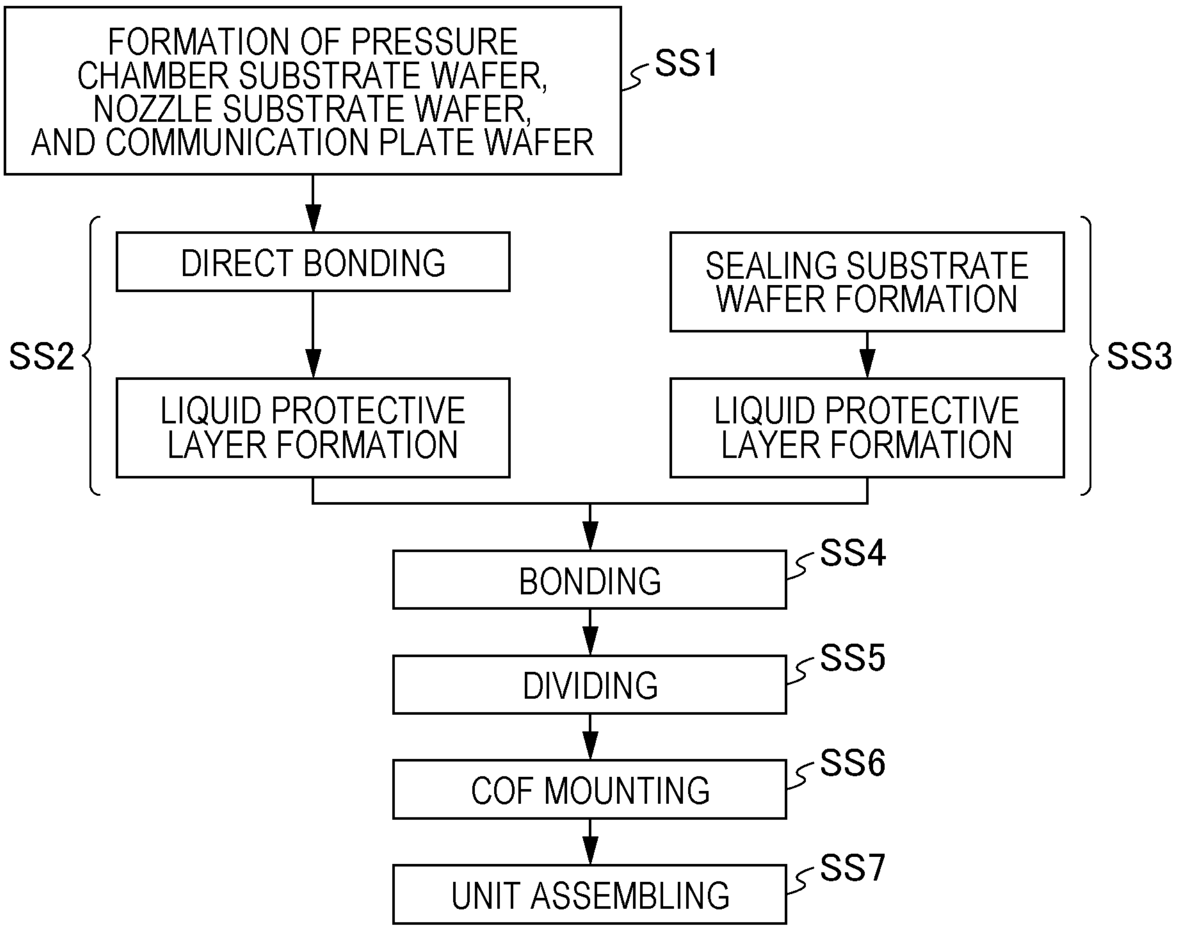
FIG. 22 is a diagram showing a flow of a method of manufacturing a liquid discharging head.

FIG. 22 is a diagram showing a flow of a method of manufacturing the liquid discharging head 3. As described above, the liquid discharging head 3 includes the pressure chamber substrate 32 including the pressure chamber C1, the communication plate 31 laminated on the pressure chamber substrate 32, and the nozzle substrate 37 laminated on the communication plate 31 and including the nozzle N. In addition, in an example of the first embodiment, the nozzle substrate 37 is configured of a semiconductor substrate.

In an example shown in FIG. 22, in step SS1, a pressure chamber substrate wafer including a plurality of pressure chamber substrates 32, a nozzle substrate wafer including a plurality of nozzle substrates 37, and a communication plate wafer including a plurality of communication plates 31 are individually formed. In step SS2, these wafers are directly bonded. Thereafter, a liquid protective layer is formed on a wall surface forming each flow path. The liquid protective layer may be formed before the direct bonding. In addition, in step SS3, a sealing substrate wafer including a plurality of sealing substrates 35 is formed, and a liquid protective layer is formed for each flow path including the communication space Ra and the like.

The above-described liquid protective layer includes tantalum oxide or hafnium oxide, for example. The chemical formula of tantalum oxide is represented by TaOx. The chemical formula of hafnium oxide is represented by HfOx. The liquid protective layer is formed by an atomic layer deposition (ALD) method, for example.

In step SS4, the sealing substrate wafer is bonded to the pressure chamber substrate wafer, the nozzle substrate wafer, and the communication plate wafer to manufacture a structure including these wafers. In step SS5, the structure is divided into chips by laser scrub and the like. In step SS6, the chips are COF-mounted on a mounting pad. COF is an abbreviation for Chip On Film. Thereafter, in step SS7, case components such as the vibration absorbing body 38, the casing portion 36, and an ink piping component are assembled by adhesion and the like. With this, the liquid discharging head 3 is obtained.

5. Modification Example

The embodiment illustrated above may be variously modified. A specific modification aspect that can be applied to the above-described embodiment is illustrated below. Any two or more aspects selected from the following illustrations can be appropriately combined as long as there is no contradiction.

The liquid discharging apparatus 1 illustrated in the first embodiment can be employed in various apparatuses such as a facsimile apparatus and a copying machine in addition to an apparatus dedicated to printing. Use of the liquid discharging apparatus is not limited to printing. For example, a liquid discharging apparatus that discharges a solution of a coloring material is used as a manufacturing apparatus that forms a color filter of a display apparatus such as a liquid crystal display panel. In addition, a liquid discharging apparatus that discharges a solution of a conductive material is used as a manufacturing apparatus that forms a wire or an electrode of a wiring substrate. In addition, a liquid discharging apparatus that discharges a solution of an organic substance related to a living body is utilized as a manufacturing apparatus that manufactures a biochip, for example.

In the above-described embodiment, the nozzle substrate 37 is a P-type single crystal silicon substrate, but may include a semiconductor material, and may be configured of other materials. In addition, the nozzle N has the tapered hole portion N1, but the nozzle N may be configured of only a straight hole.

What is claimed is:

1. A method of manufacturing a liquid discharging head including a pressure chamber substrate that includes a pressure chamber and a nozzle substrate that includes a nozzle communicating with the pressure chamber and is formed of a semiconductor substrate, the method comprising:

a first step in which, in a state where a metal film is formed on the nozzle substrate in a first portion corresponding to the nozzle of a first surface which is a surface of the nozzle substrate on a pressure chamber substrate side, and the metal film is not formed on the nozzle substrate in a second portion not corresponding to the nozzle of the first surface, the nozzle is formed by carrying out metal assist chemical etching.

2. The method of manufacturing a liquid discharging head according to claim 1, wherein the first step includes forming a resist layer on the first surface, patterning the resist layer to be opened at the first portion and not to be opened at the second portion after forming the resist layer, and forming the metal film on the first surface after patterning the resist layer.

3. The method of manufacturing a liquid discharging head according to claim 2, wherein an oxide film is formed on the first surface before forming the resist layer, the resist layer is formed on the oxide film, and after patterning the resist layer and before forming the metal film, a portion of the oxide film on the first portion is opened by etching the oxide film.

4. The method of manufacturing a liquid discharging head according to claim 3, wherein a gap is formed between the first surface and the resist layer by etching the oxide film.

5. The method of manufacturing a liquid discharging head according to claim 2, wherein in the first step, the metal film is formed on the first surface and then the resist layer is removed.

6. The method of manufacturing a liquid discharging head according to claim 1, wherein in the first step, the metal assist chemical etching is carried out using a solution including hydrogen fluoride and an oxidizing agent.

7. The method of manufacturing a liquid discharging head according to claim 6, wherein in the first step, a tapered angle of the nozzle is adjusted according to a ratio of the hydrogen fluoride and the oxidizing agent.

8. The method of manufacturing a liquid discharging head according to claim 6, wherein the oxidizing agent is hydrogen peroxide water.

9. The method of manufacturing a liquid discharging head according to claim 8, wherein in the first step, when a molar concentration of the hydrogen fluoride is denoted as [HF] and a molar concentration of the oxidizing agent is denoted as $[H_2O_2]$, $0.47 \leq [HF]/([HF]+[H_2O_2]) \leq 0.78$ is satisfied.

10. The method of manufacturing a liquid discharging head according to claim 8, wherein in the first step, $0.56 \leq [HF]/([HF]+[H_2O_2]) \leq 0.71$ is satisfied.

11. The method of manufacturing a liquid discharging head according to claim 8, wherein in the first step, as the metal assist chemical etching, a first metal assist chemical etching and a second metal assist chemical etching after the first metal assist chemical etching are carried out, when a molar concentration of the hydrogen fluoride is set to [HF] and a molar concentration of the oxidizing agent is denoted as $[H_2O_2]$, $[HF]/([HF]+[H_2O_2])$ is larger when the first metal assist chemical etching is carried out than when the second metal assist chemical etching is carried out.

12. The method of manufacturing a liquid discharging head according to claim 6, wherein in the first step, as the metal assist chemical etching, a first metal assist chemical etching and a second metal assist chemical etching after the first metal assist chemical etching are carried out, and when the first metal assist chemical etching is carried out, an electric field is not applied to the solution, and when the second metal assist chemical etching is carried out, an electric field is applied to the solution.

13. The method of manufacturing a liquid discharging head according to claim 1, wherein the metal film is made of gold.

14. A method of manufacturing a nozzle substrate including a nozzle and formed of a semiconductor substrate, the method comprising:

a first step in which, in a state where in a first portion corresponding to the nozzle of a first surface of the nozzle substrate, a metal film is formed on the nozzle substrate, and in a second portion not corresponding to the nozzle of the first surface, the metal film is not formed on the nozzle substrate, the nozzle is formed by carrying out metal assist chemical etching.

* * * * *